United States Patent
Grip et al.

(10) Patent No.: US 10,974,807 B2
(45) Date of Patent: Apr. 13, 2021

(54) SEGMENTED AIRCRAFT WING HAVING SOLAR ARRAYS

(71) Applicant: The Boeing Company, Chicago, IL (US)

(72) Inventors: Robert Erik Grip, Rancho Palos Verdes, CA (US); Blaine Knight Rawdon, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 262 days.

(21) Appl. No.: 15/957,909

(22) Filed: Apr. 20, 2018

(65) Prior Publication Data

US 2019/0100323 A1 Apr. 4, 2019

Related U.S. Application Data

(62) Division of application No. 14/880,278, filed on Oct. 12, 2015, now Pat. No. 9,950,802, which is a division of application No. 13/276,750, filed on Oct. 19, 2011, now Pat. No. 9,156,559.

(51) Int. Cl.
*B64C 3/26* (2006.01)
*B64C 3/18* (2006.01)
*B64C 3/22* (2006.01)
*B64D 27/24* (2006.01)

(52) U.S. Cl.
CPC .............. *B64C 3/26* (2013.01); *B64C 3/18* (2013.01); *B64C 3/182* (2013.01); *B64C 3/185* (2013.01); *B64C 3/187* (2013.01); *B64C 3/22* (2013.01); *B64D 27/24* (2013.01); *B64D 2211/00* (2013.01); *Y02T 50/40* (2013.01); *Y02T 50/50* (2013.01); *Y02T 50/60* (2013.01); *Y10T 156/10* (2015.01)

(58) Field of Classification Search
CPC ....... B64D 27/24; B64D 2211/00; B64C 3/18; B64C 3/182; B64C 3/185; B64C 3/187; B64C 3/22; B64C 3/26
See application file for complete search history.

(56) References Cited

U.S. PATENT DOCUMENTS

| | | |
|---|---|---|
| 1,343,707 A | 6/1920 | Carns |
| 1,548,403 A | 8/1925 | Wylie |
| 1,760,386 A | 5/1930 | Vliet |
| 1,765,791 A | 6/1930 | Fokker |
| 1,766,107 A | 6/1930 | Cook, Jr. |
| 2,400,649 A | 5/1946 | Larsen |
| 2,749,061 A * | 6/1956 | Franz ................. B64C 3/26 244/123.12 |
| 2,981,337 A | 4/1961 | Stuart |
| 3,013,614 A | 12/1961 | Platt |

(Continued)

OTHER PUBLICATIONS

Extended European Search Report, dated Jul. 14, 2014, regarding Application No. EP13154386.0, 7 pages.

(Continued)

*Primary Examiner* — Marc Burgess
(74) *Attorney, Agent, or Firm* — Yee & Associates, P.C.

(57) ABSTRACT

An aircraft wing has a plurality of wing segments mounted on a wing spar by joints that allow relative movement between the spar and the wing segments. Tuning of coefficients of thermal expansion is employed to reduce induced stresses from changes in temperature.

12 Claims, 28 Drawing Sheets

(56) References Cited

U.S. PATENT DOCUMENTS

| | | | |
|---|---|---|---|
| 3,756,541 A | | 9/1973 | Orazi |
| 3,994,451 A | | 11/1976 | Cole |
| 4,117,900 A | | 10/1978 | Amick |
| 4,577,815 A | | 3/1986 | Orazi |
| 4,739,954 A | | 4/1988 | Hamilton |
| 4,824,053 A | | 4/1989 | Sarh |
| 5,496,002 A | * | 3/1996 | Schutze ............... B29C 70/085 244/123.3 |
| 5,501,414 A | * | 3/1996 | Bauer ..................... B64C 3/18 244/123.4 |
| 5,810,284 A | * | 9/1998 | Hibbs .................... B64C 39/10 244/13 |
| 5,984,230 A | | 11/1999 | Orazi |
| 6,644,599 B2 | | 11/2003 | Perez |
| 6,868,314 B1 | * | 3/2005 | Frink ..................... B64C 1/00 244/119 |
| 7,029,100 B2 | * | 4/2006 | Silverbrook ......... B41J 2/17559 347/54 |
| 7,306,187 B2 | * | 12/2007 | Lavan ..................... B64B 1/14 244/123.11 |
| 7,762,500 B1 | | 7/2010 | Dhall |
| 8,128,025 B2 | | 3/2012 | Rawdon et al. |
| 8,931,733 B2 | | 1/2015 | Dyckrup |
| 9,162,761 B2 | * | 10/2015 | Farbolin ............... B64C 31/02 |
| 9,481,444 B2 | * | 11/2016 | Kismarton ............. B64C 3/26 |
| 2002/0100842 A1 | | 8/2002 | Perez |
| 2005/0116086 A1 | | 6/2005 | Orazi |
| 2006/0145030 A1 | | 7/2006 | Cowan et al. |
| 2008/0001028 A1 | | 1/2008 | Kendall et al. |
| 2009/0026321 A1 | | 1/2009 | Sarh et al. |
| 2009/0236473 A1 | | 9/2009 | Rawdon et al. |
| 2010/0213309 A1 | | 8/2010 | Parks |
| 2011/0017876 A1 | | 1/2011 | Manley et al. |
| 2011/0101172 A1 | | 5/2011 | Dyckrup |
| 2013/0099063 A1 | | 4/2013 | Grip et al. |
| 2013/0240671 A1 | | 9/2013 | Kruse et al. |
| 2015/0014482 A1 | * | 1/2015 | Weierman ............... B64C 3/56 244/124 |
| 2016/0318618 A1 | | 11/2016 | Grip et al. |

OTHER PUBLICATIONS

Extended European Search Report, dated Mar. 19, 2015, regarding Application No. EP12188937.2, 7 pages.

"AeroVironment," Wikipedia, 4 pages, accessed Oct. 19, 2011, http://en.wikipedia.org/wiki/AeroVironment.

"Gossamer Penguin," Wikipedia, 1 page, accessed Oct. 19, 2011, http://en.wikipedia.org/wiki/Gossamer_Penguin.

"List of human-powered aircraft," Wikipedia, 9 pages, accessed Oct. 19, 2011, http:\\en.wikipedia.org/wiki/list_of_human-powered_aircraft.

"Solar Flight News," SolarFlight, 3 pages, accessed May 6, 2011, http://solar-flight.com/news/index.html.

"UAS Advanced Development: Solar Challenger," AeroVironment, Inc., UAS Advanced Development Center, 2 pages, accessed Oct. 19, 2011, http://www.avinc.com/uas/adc/solar_challenger/.

Office Action, dated Jul. 31, 2014, regarding U.S. Appl. No. 13/419,791, 14 pages.

Office Action, dated Mar. 2, 2015, regarding U.S. Appl. No. 13/419,791, 13 pages.

Office Action, dated Feb. 9, 2015, regarding U.S. Appl. No. 13/276,750, 23 pages.

Notice of Allowance, dated Jun. 2, 2015, regarding U.S. Appl. No. 13/276,750, 8 pages.

Final Office Action, dated Sep. 11, 2015, regarding U.S. Appl. No. 13/419,791, 8 pages.

Notice of Allowance, dated Jan. 20, 2016, regarding U.S. Appl. No. 13/419,791, 5 pages.

Office Action, dated May 11, 2017, regarding U.S. Appl. No. 14/880,278, 23 pages.

Final Office Action, dated Oct. 2, 2017, regarding U.S. Appl. No. 14/880,278, 11 pages.

Notice of Allowance, dated Dec. 18, 2017, regarding U.S. Appl. No. 14/880,278, 7 pages.

* cited by examiner

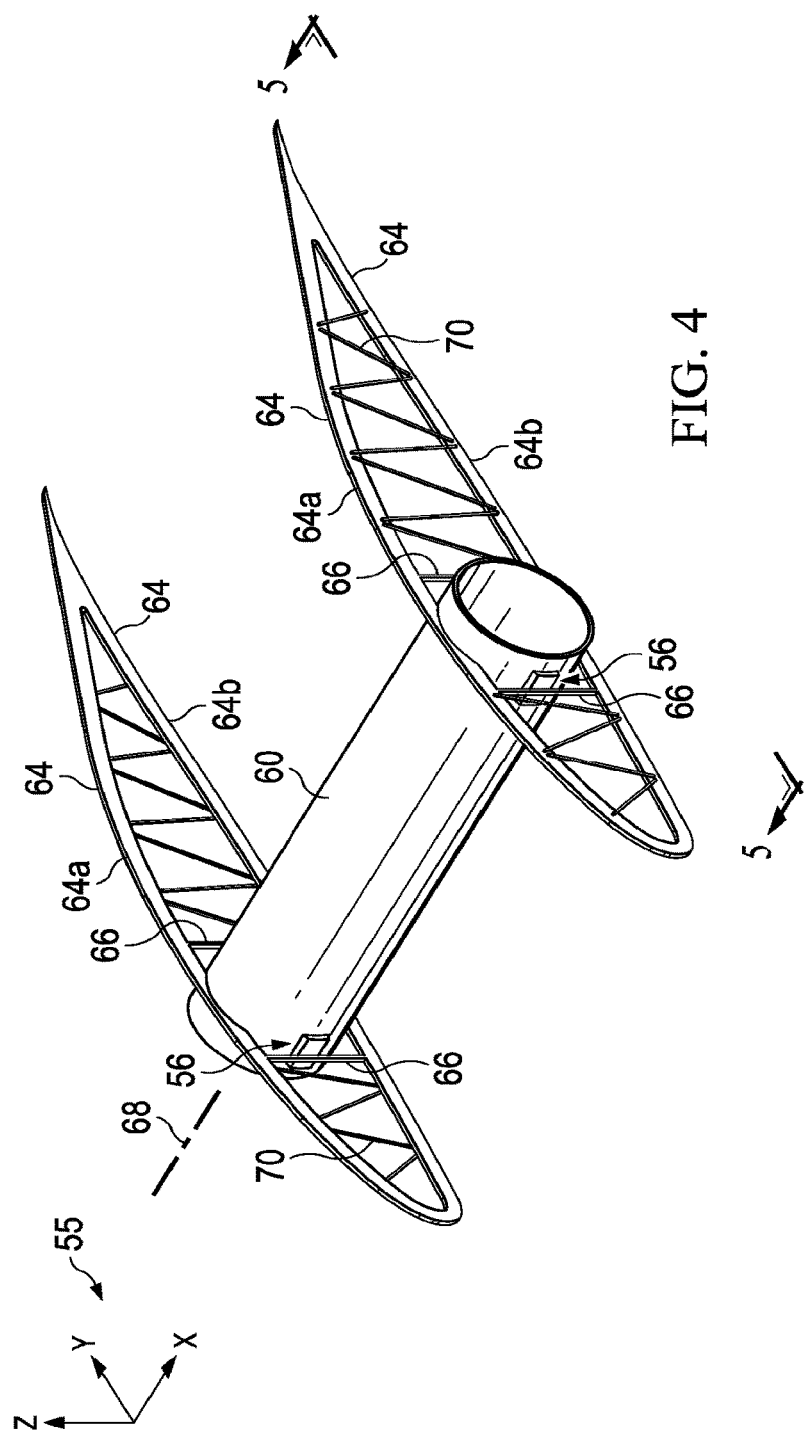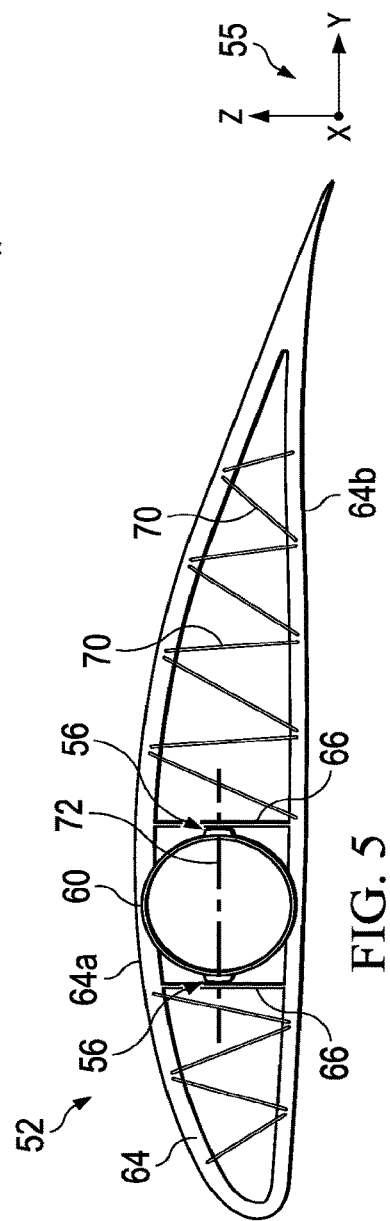

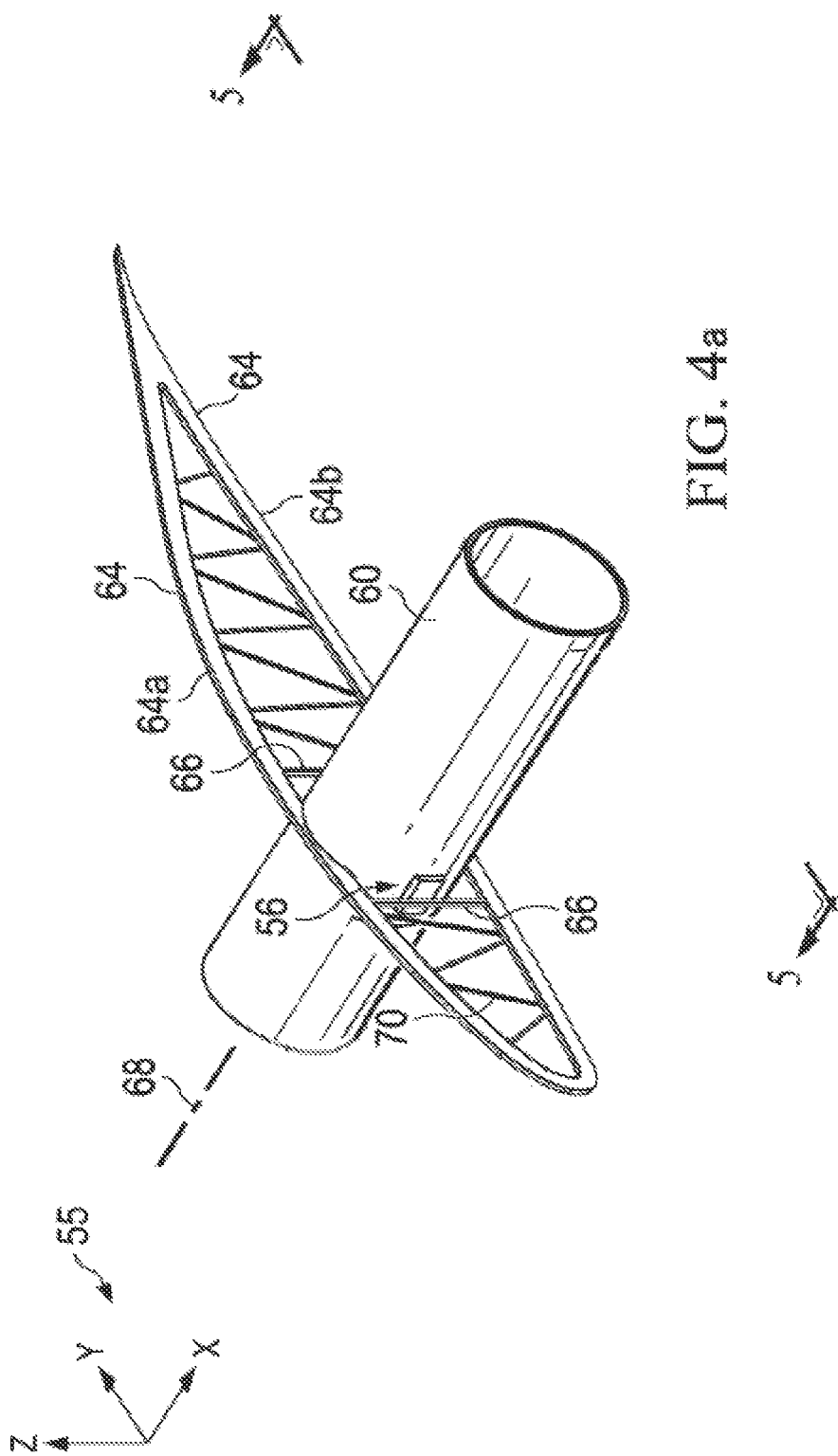

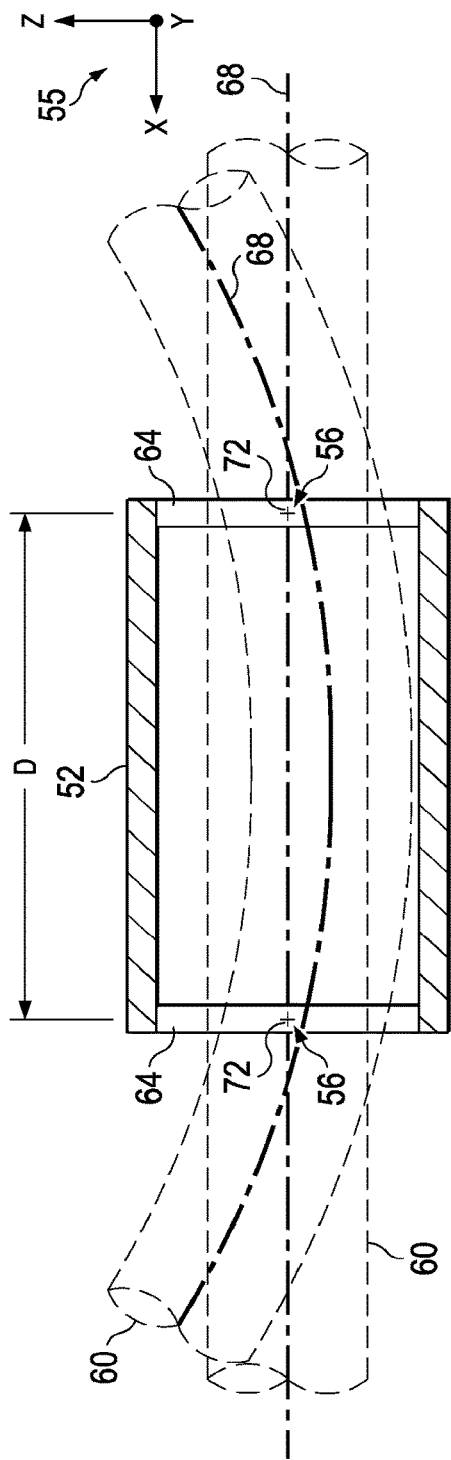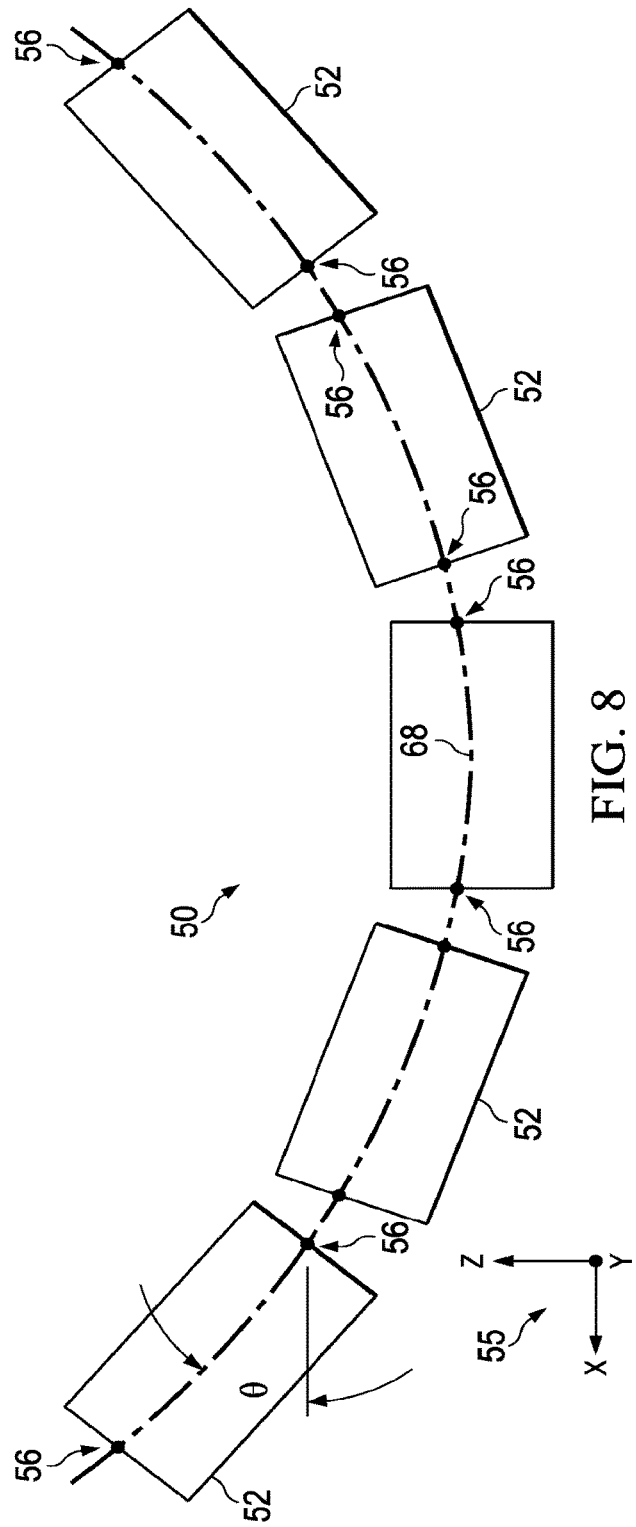
FIG. 7
FIG. 8

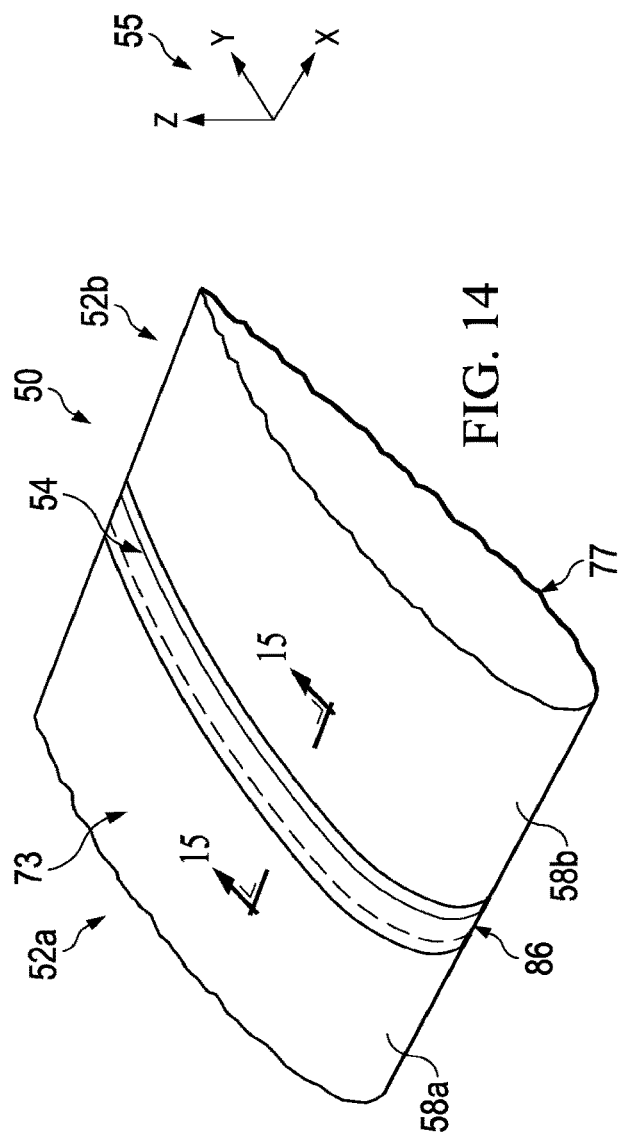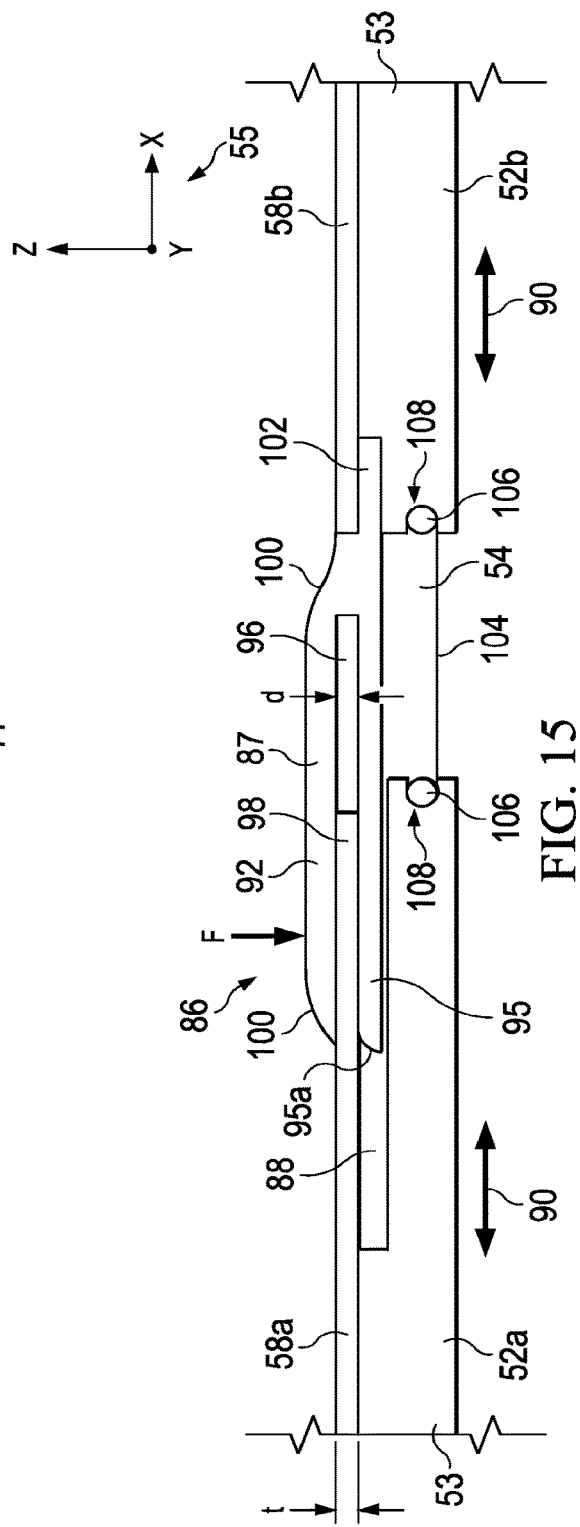

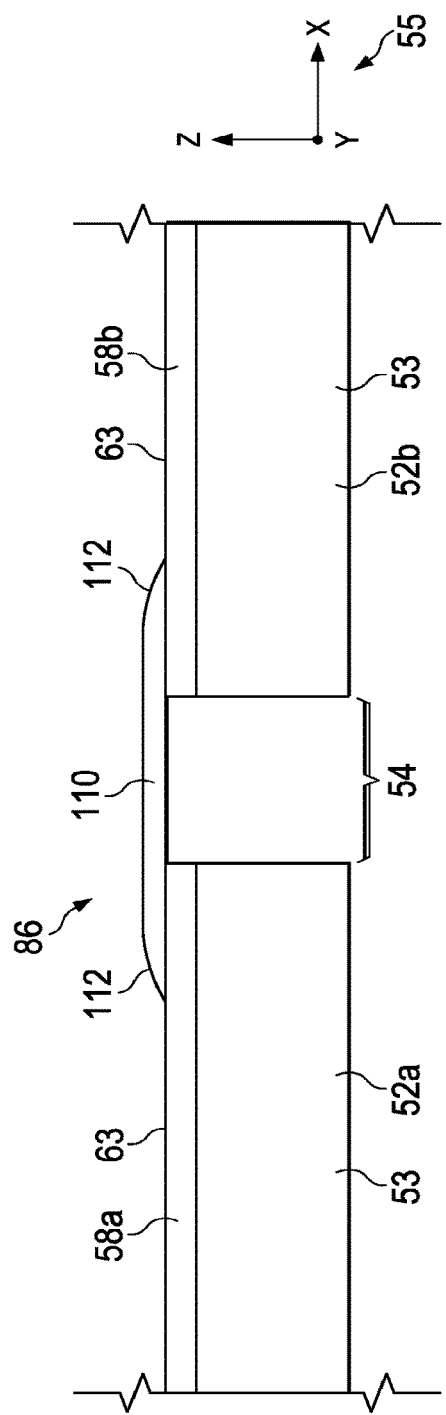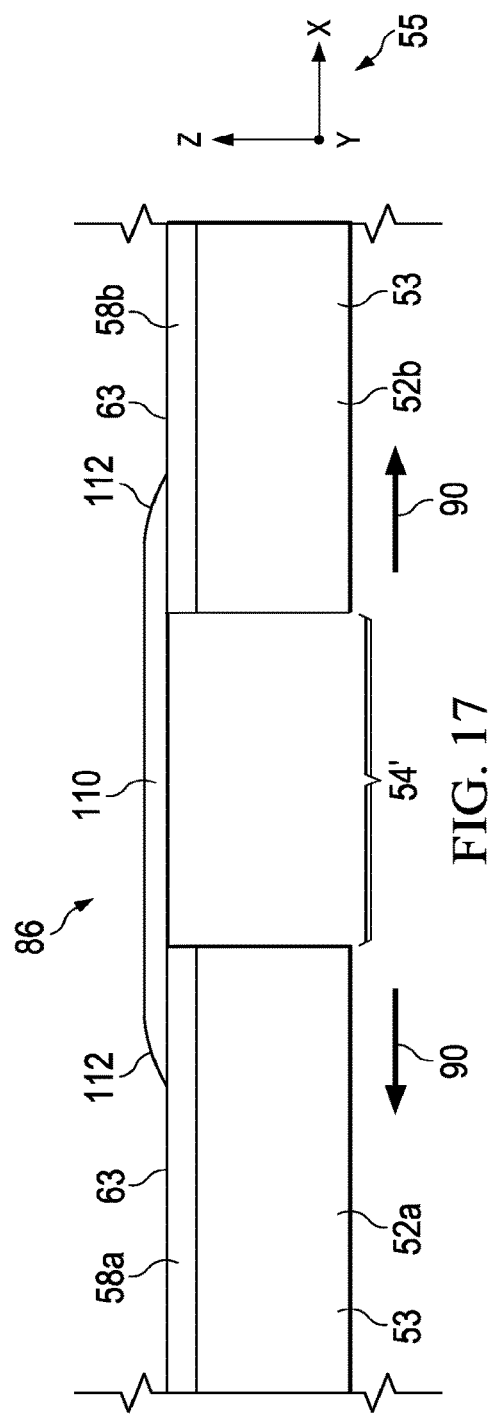

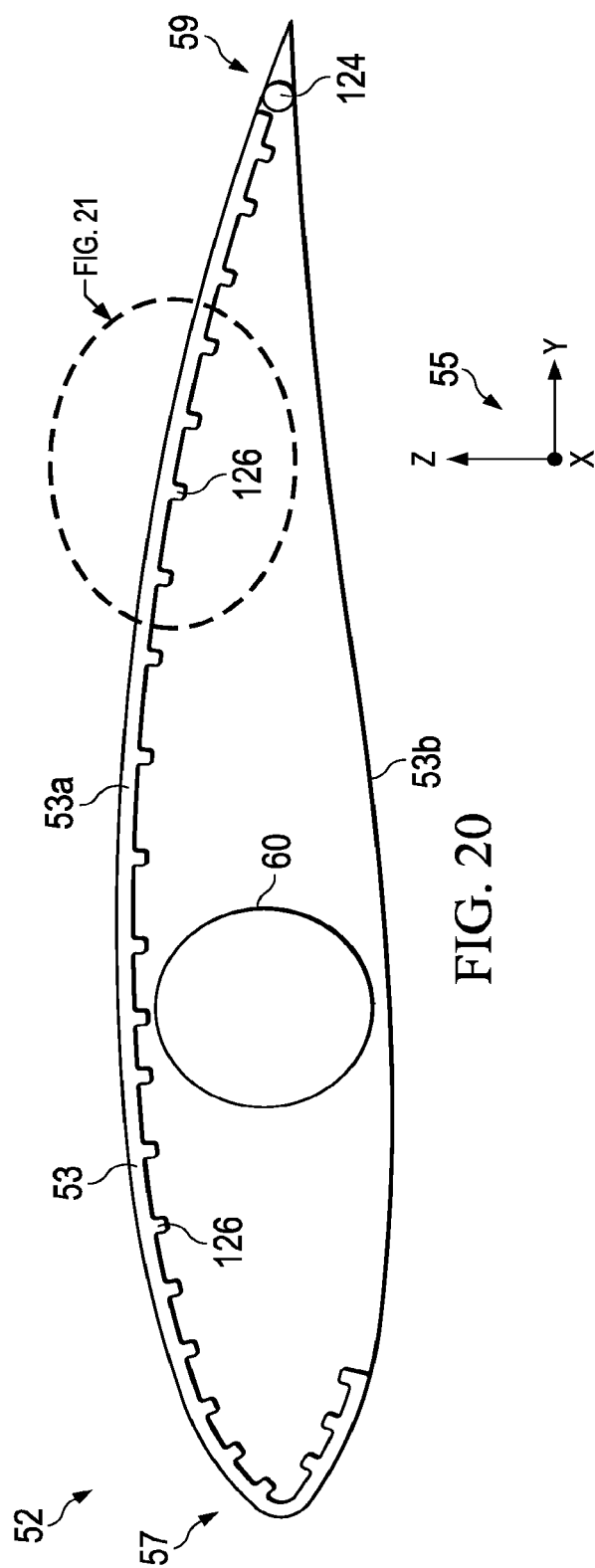
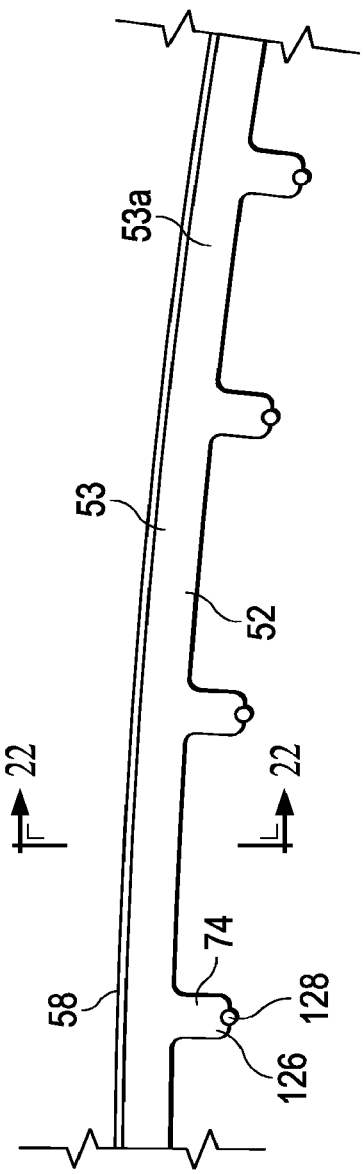
FIG. 20
FIG. 21

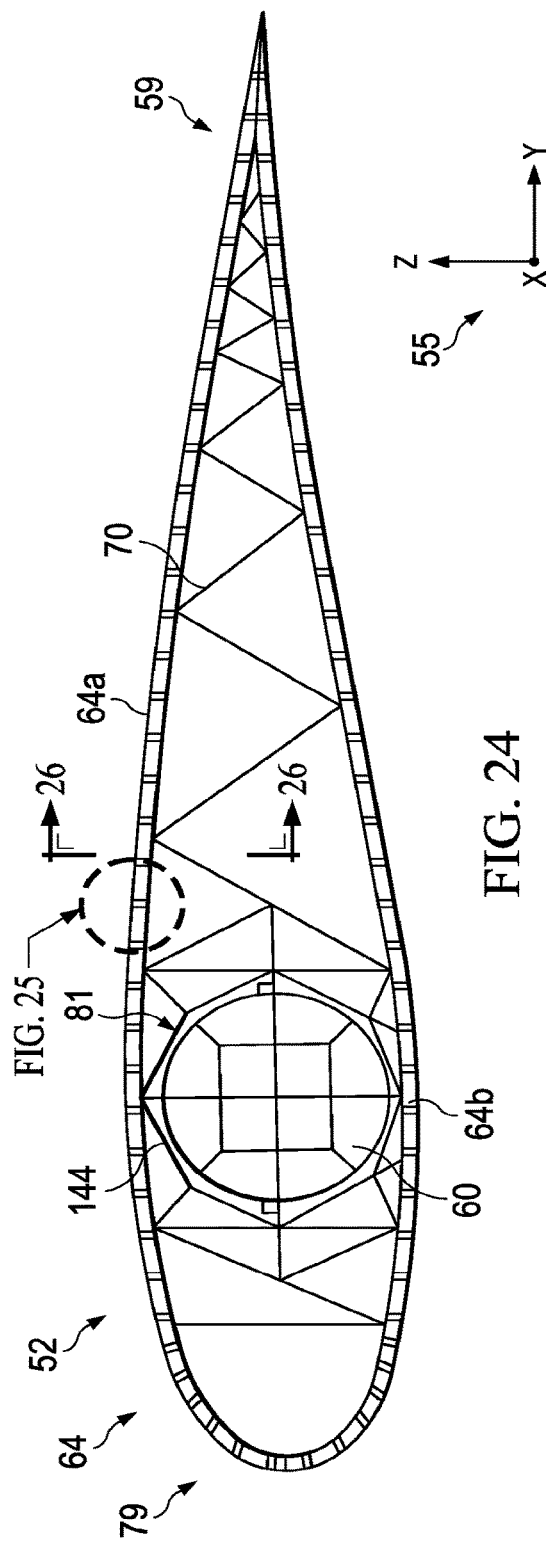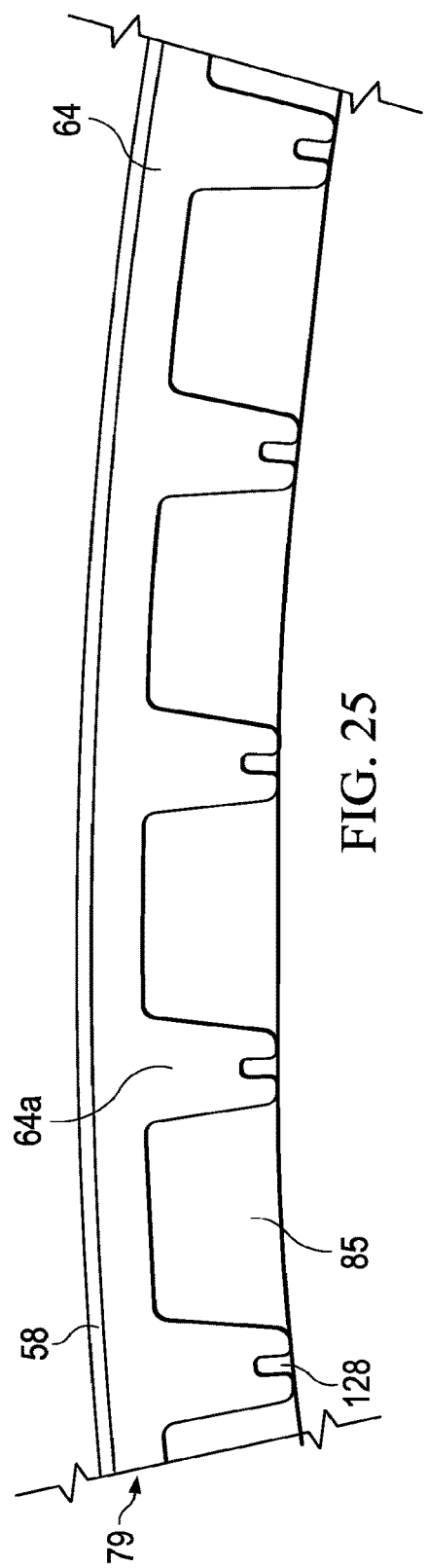
FIG. 24
FIG. 25

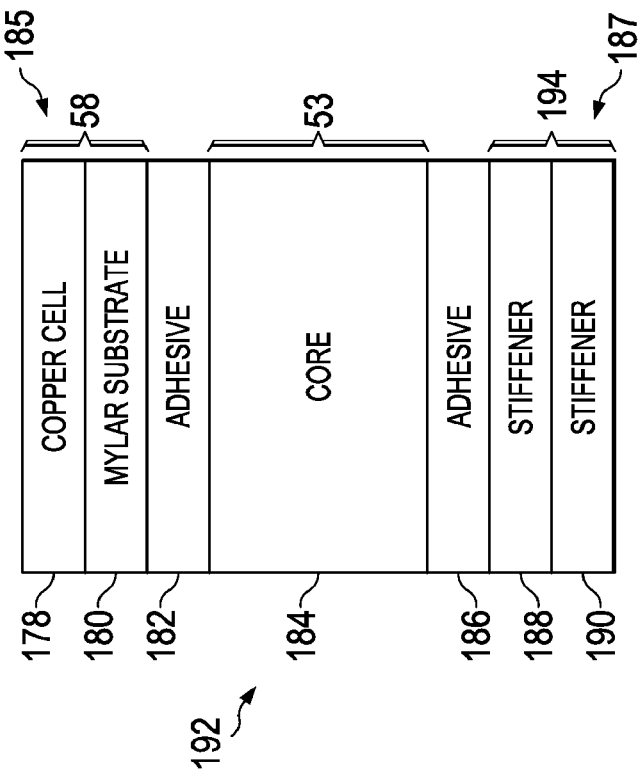
FIG. 33
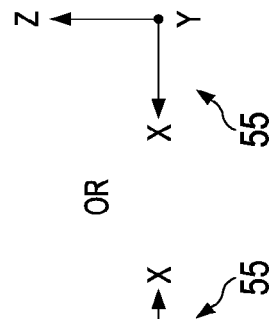
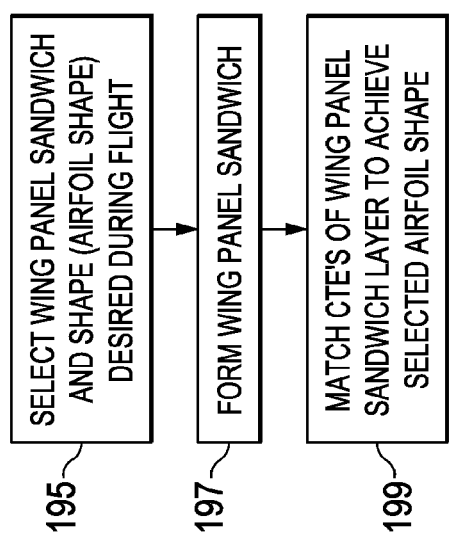
FIG. 35
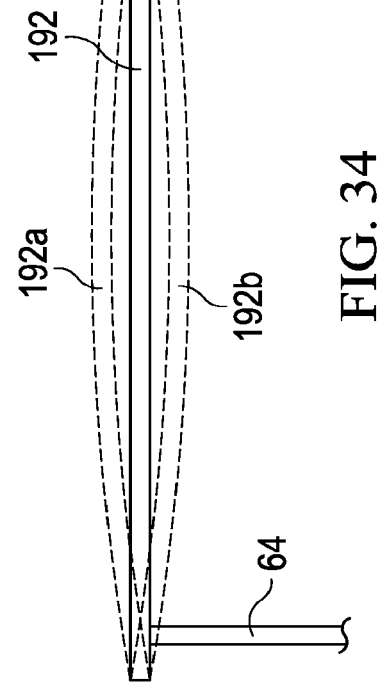
FIG. 34

SEGMENTED AIRCRAFT WING HAVING SOLAR ARRAYS

CROSS-REFERENCE TO RELATED APPLICATION(S)

This application is a divisional application of U.S. patent application Ser. No. 14/880,278, filed Oct. 12, 2015, now U.S. Pat. No. 9,950,802; which is a divisional application of U.S. patent application Ser. No. 13/276,750, filed Oct. 19, 2011, now U.S. Pat. No. 9,156,559.

STATEMENT REGARDING FEDERALLY SPONSORED RESEARCH OR DEVELOPMENT

This invention was made with U.S. Government support under Agreement No. HR0011-10-9-0010, awarded by the Defense Advanced Research Projects Agency (DARPA). The U.S. Government has certain license rights in the invention.

BACKGROUND INFORMATION

1. Field

This disclosure generally relates to aircraft wings, and deals more particularly with a light-weight, flexible wing having solar panels for generating electrical power.

2. Background

Aircraft are known that have arrays of photovoltaic solar cells (hereinafter referred to as solar panels) on the aircraft's wings for converting solar energy into electrical power. The electrical power may be used to operate on-board aircraft systems and/or to propel the aircraft, typically using one or more electric motors and propellers. The solar panels are typically mounted on upper surfaces of the wings because this location provides favorable exposure to sunlight and provides a relatively large area that is sufficient for mounting the number and size of the solar panels that are needed for the application.

Designing solar powered aircraft, particularly those flying at high altitudes, has several challenges. Because the solar energy collected by the panels is relatively low in density, the amount of solar generated power available for propulsion of the aircraft is relatively small, which in turn dictates that the aircraft have a relatively large wingspan and be very lightweight. However, long, lightweight wings may be highly flexible, presenting a number of problems due to the loads imposed on the wings during flight. For example, typical lightweight solar panels have a foundation of copper, rendering them relatively stiff with a relatively high coefficient of thermal expansion (CTE). Flexing of the wings during flight may cause the solar panels to experience high strains that can adversely affect the integrity of the solar panels. These strains may also result in buckling or wrinkling of the solar panels which may trip the airflow boundary layer over the wings from laminar to turbulent, or cause air flow separation, which may significantly reduce the aerodynamic performance of the aircraft.

The integrity of the solar panels and/or the aerodynamic performance of the wings may also be adversely affected by large temperature swings experienced by the aircraft during flight. These temperature swings may result in excessive stresses and strains between the solar panel and the wing structure, due to differences in thermal expansion.

Accordingly, there is a need for a flexible, lightweight, solar panel equipped wing that substantially isolates the solar panels from strains experienced during flight due to wing flexing and/or differences in thermal expansion between the components of the wing. There is also a need for a wing design incorporating solar panels of the type mentioned above that is manufacturable, durable and reliable.

SUMMARY

The disclosed embodiments provide a lightweight, flexible aircraft wing that may have a relatively long wingspan equipped with solar panels. The solar panels are substantially isolated from strains produced by wing deflection and/or changes in temperature by segmenting the wing into separate wing segments that are mounted on a wing spar by pivotal joints. This wing segmenting and wing segment mounting arrangement provides a stable load path allowing transfer of aerodynamic and inertial loads from the wing segment structure to the spar, while isolating the solar panels from loads produced by wing spar flexing. The solar panels may be formed of multiple solar cells laminated into a single planar form conforming to the single curvature wing surface with relatively low strain levels. Dimensional changes due to thermal expansion are accommodated as a result of the wing segmentation and the pivotal joints between the wing segments and the spar. In one embodiment, rigid rods incorporated into wing segment stringer blades are used to both stiffen the wing segment and conduct electricity generated by the solar panels.

According to one disclosed embodiment, an aircraft wing comprises an elongate wing spar, and a plurality of wing segments supported on the spar. Joints between each of the wing segments and the spar allow movement of the wing segments relative to the spar. Each of the joints may include a pivotal connection allowing the wing segment to pivot on the spar. Each of the wing segments includes a pair of spaced apart ribs, and the pivotal connections may include pivotal links between the ribs and the spar. The aircraft wing further comprises a solar panel on at least certain of the wing segments for collecting solar energy.

According to another embodiment, a method is provided of reducing internal loads on portions of an aircraft wing, comprising segmenting the wing into a plurality of separate wing segments, and mounting each of the wing segments on a wing spar for movement relative to the wing spar. Mounting each of the wing segments includes pivotally attaching ribs of the wing segments to the spar. The method may further include mounting solar panels on at least certain of the wing segments, and substantially isolating the solar panels from bending loads applied to the spar by allowing the wing segments to pivot on the spar as the spar bends in response to the loads.

According to still another embodiment, an aircraft wing comprises a wing spar, a plurality of separate wing segments each having an outer wing skin. The wing segments are spaced apart to form variable gaps between the wing segments. A cover extends between adjacent ones of the wing segments and covers the variable gap between the adjacent wing segments. The cover may include an elastic membrane attached to the outer skin of the adjacent wing segments. The elastic membrane may be sealed to the skin and forms a substantially airtight enclosure covering the gap. The wing may further comprise a solar panel on each of the wing segments, wherein the closure includes a wiper secured to one of the adjacent panels and extending across the gap which engages the surface of the solar panel on the adjacent wing segment.

According to a further embodiment, an aircraft wing comprises at least one wing segment having an outer skin, and a solar collection panel mounted on the skin for generating electricity using collected solar energy. The aircraft wing further comprises at least one electrically conductive, substantially rigid reinforcing member attached to the skin and extending in a span-wise direction of the wing for reinforcing the skin. The reinforcing member is electrically coupled with the solar panel and conducts electricity generated by the solar panel. The wing may further comprise a plurality of stringers integral with the skin and extending in the span-wise direction of the wing segment. The stringers may be in the shape of a blade. The stringers are connected to a rib cap at two locations along the span-wise dimension. The two locations at which the stringer is connected to the rib cap may be at the ends of the span. The wing further comprises a plurality of substantially rigid, electrically conductive reinforcing rods respectively on at least one of the caps and extending in the span-wise direction. The wing further comprises a pair of spaced apart wing ribs extending in a chord-wise direction of the wing segment for reinforcing the skin. Each of the ribs includes an electrically conductive upper cap electrically connecting the rods with the solar panels.

According to still another embodiment, an aircraft wing comprises a sandwich panel construction including an upper solar panel, at least one lower reinforcing layer and a core sandwiched between the solar panel and the lower reinforcing layer, wherein the coefficients of thermal expansion of the solar panel and the lower reinforcing layer are substantially matched with each other.

According to a further embodiment, a method is provided of fabricating an aircraft wing, comprising selecting a desired airfoil shape for the wing, forming a wing panel sandwich by laminating a core between upper and lower reinforcement layers, and matching the coefficients of thermal expansion of the upper and lower reinforcement layers based on the selected airfoil shape.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is an illustration of a perspective view of a pair of wing ribs pivotally mounted on a portion of the wing spar.

FIG. 4a is an illustration of a perspective view of a single wing rib pivotally mounted on a portion of the wing spar.

FIG. 5 is an illustration of an end view taken in the direction designated as FIG. 5 in FIG. 4.

FIG. 7 is an illustration of a diagrammatic, front view showing flexing of the wing spar in the vertical direction relative to a wing segment shown in cross section.

FIG. 8 is an illustration of a front view of the segmented wing, flexed in the vertical direction, showing the individual wing segments having pivoted to conform to the vertical curvature of the spar.

FIG. 14 is an illustration of a perspective view of a pair of adjacent wing segments, showing an aerodynamic cover spanning the gap between the wing segments.

FIG. 15 is an illustration of a sectional view taken along the line 15-15 in FIG. 14.

FIG. 16 is an illustration similar to FIG. 15 but showing an alternate form of the gap cover.

FIG. 17 is an illustration similar to FIG. 16 but showing the adjacent wing segments having moved apart and the cover having been stretched over the gap.

FIG. 20 is an illustration of a cross sectional view near the end of the segment of an alternate form of a wing segment having integral blade stringers stiffened by rigid rods.

FIG. 21 is an illustration of the area designated as FIG. 21 in FIG. 20.

FIG. 24 is an illustration of a cross sectional view of an alternate form of the wing segment having electrically conductive ribs.

FIG. 25 is an illustration of the area designated as FIG. 25 in FIG. 24.

FIG. 33 is a generalized sandwich construction of a wing segment that may be tuned to preventing substantial bowing of the wing segment.

FIG. 34 is an illustration of a perspective view showing bowing of a wing segment resulting from differences in thermal expansion of materials used in the wing segment sandwich shown in FIG. 33.

FIG. 35 is a flow diagram of a method of tuning a wing panel sandwich construction to achieve a desired airfoil shape.

DETAILED DESCRIPTION

Figure 1:
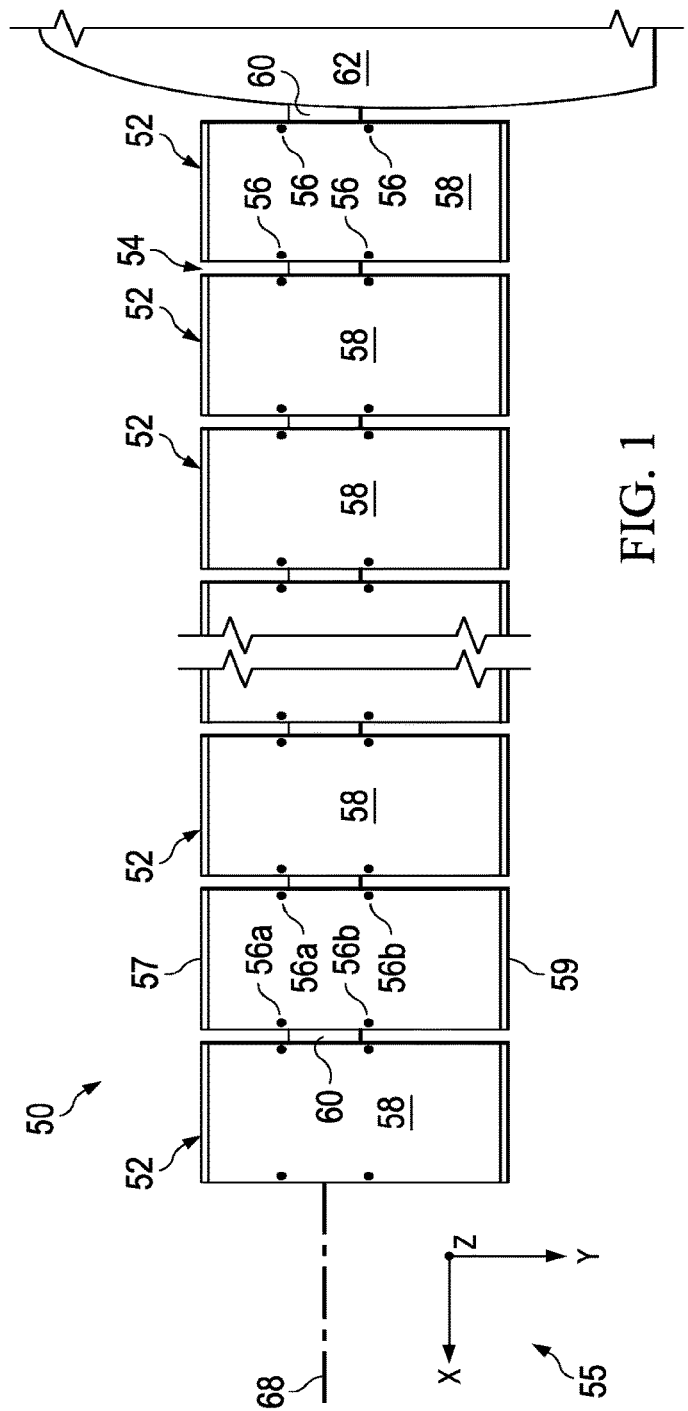
FIG. 1 is an illustration of a segmented wing having solar panels according to one disclosed embodiment.

Referring first to FIG. 1, an aircraft wing 50 may be attached to a pod or fuselage 62 and is segmented into a plurality of separate wing segments 52 that are spaced apart from each other to form gaps 54 of variable width. It should be noted however, the principals of the disclosed embodiments are applicable to a wing 50 comprising a "flying wing" type aircraft that does not employ a pod or fuselage. Each of the wing segments 52 may be mounted on wing spar 60 for movement relative to the wing spar 60 when the wing spar flexes during flight. In one embodiment, each of the wing segments 52 is attached to and supported on the wing spar 60 by pivotal joints 56, however, other types of joints allowing this relative movement between the wing segments 52 and the wing spar 60 are possible. The pivotal joints 56 may comprise a pair of laterally spaced forward joints 56a, and a pair of laterally spaced aft joints 56b. In the illustrated embodiment, four pivotal joints 56 pivotally connect each wing segment 52 to the spar 60, however in other embodiments, more or less than four pivotal joints 56 may be employed. In the illustrated example, the spar 60 is substantially circular in cross section throughout its length, however other cross sectional shapes may be possible, either along a portion of or the entire length of the wing 50. Further, the cross section shape of the spar 60 may vary and/or taper along its length.

For convenience of description, an X,Y,Z Cartesian coordinate system 55 will be used to describe the orientation of the various components of the wing 50. The X direction may be sometimes also referred to as the span-wise direction, and the Y direction may be referred to as the chord-wise or fore and aft direction, while the Z direction may also be referred to as the vertical direction. As will be discussed below in more detail, the wing spar 60, and thus the wing 50, may twist about its longitudinal axis 68 and/or simultaneously flex in the XY and XZ panes, or any combination of the XY and YZ planes along with twisting about the longitudinal axis 68. Each of the wing segments 52 has a leading edge 57, and a trailing edge 59. One or more of the wing segments may include a solar panel 58 for collecting solar energy and converting it into electrical power. The spar 60 may be produced from any suitable material such as, for example and without limitation, carbon fiber epoxy and has a longitudinal axis 68 that normally extends span-wise in the Y direction 55. However, the spar 60 may flex fore and aft in the XY plane 55 as well as in the vertical direction (Z axis). The span-wise spacing between the wing segments 52 forming the variable width gaps 54 provides clearance between the segments 52 that that allows the segments 52 to move in both the XY and XZ planes 55 or any combination thereof without interfering with each other. While each of the wing segments 52 is shown as having a solar collection panel 58 mounted thereon it is possible that in some embodiments only certain of the wing segments 52 may include one or more solar panels 58.

Segmentation of the wing 50 into separate wing segments 52, and use of joints 56 allowing relative movement between the wing segments 52 and the wing spar substantially isolates the solar panels 58 from strains produced by wing deflection and/or changes in temperature during flight. This wing segmentation along with the pivotal joints 56 provides a stable load path allowing transfer of aerodynamic and inertial loads from the wing segment 52 to the spar 60, while isolating the solar panels 58 from loads produced by flexing of the wing spar 60 during flight, and/or dimensional changes due to thermal expansion of the components of the wing 50.

Figure 2:
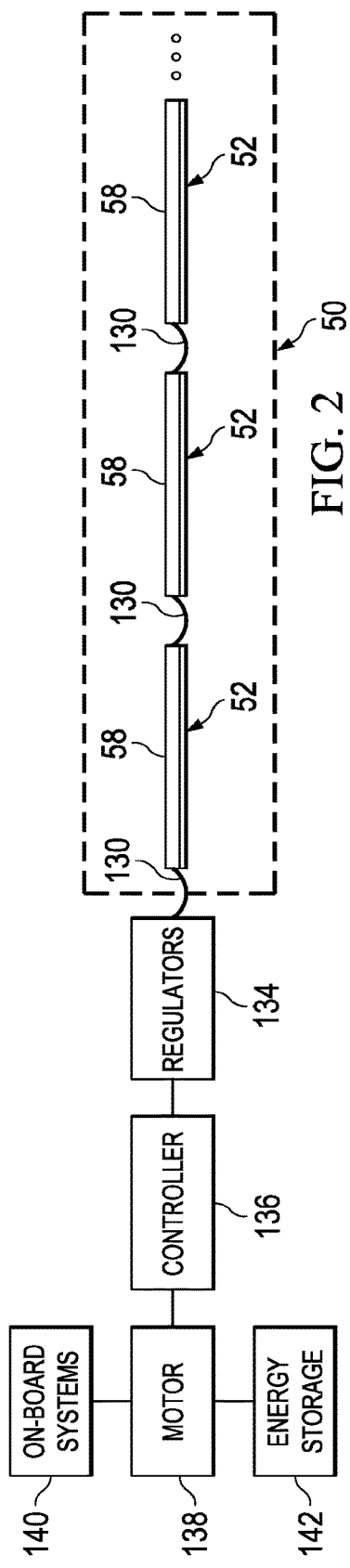
FIG. 2 is an illustration of a combined block and diagrammatic view of the segmented wing shown in FIG. 1, along with an onboard electrical system.

Referring now to FIG. 2, the solar collection panels 58 are electrically coupled with each other and with one or more on-board regulators 134 by means of electrical conductors 130 which will be discussed later in more detail. The regulator 134 regulates DC power generated by the solar panels 58 into AC power which is controlled by a controller 136 to operate propulsion motors 138, and/or other on board systems 140. The power generated by the solar panels 58 may also directed to energy storage devices 142 such as on-board batteries.

Attention is now directed to FIGS. 3, 4, 4a and 5 which show additional details of one of the wing segments 52. Each of the wing segments 52 includes a pair of spaced apart wing ribs 64, each generally in the shape of an air foil and may be stiffened by truss members 70 extending between upper and lower caps 64a, 64b respectively of the rib 64. In other embodiments, the ribs 64 may be stiffened by means other than truss members 70. Each of the ribs 64 further includes a generally vertical rib bracket 66, fore and aft of the spar 60. Each of the rib brackets 66 is coupled with the wing spar 60 by one of the pivotal joints 56. The ribs 64 are structurally connected with each other by an outer skin 53 as well as by structural stiffeners such as stringers 74 which may be formed of any suitable, lightweight structural material, such as a composite.

The pivotal joints 56 allow the wing segments 52 to pivot on fore and aft axes 72 relative to the spar 60 when the spar 60 flexes during flight. While the illustrated wing segment 52 employs two spaced apart wing ribs 64, in an alternate embodiment (shown in FIG. 4a), the wing segment 52 may be fixedly mounted on the spar 60 by a single wing rib 64 that is generally located near the span-wise center of the segment 52 along the axis 68 of the spar 60, and may form the sole support between the wing segment 52 and the wing spar 60. The use of a single wing rib 64 may be desirable in applications where the wing segments 52 are relatively narrow.

The outer skin 53 (FIG. 3) may be stiffened as required by the stringers 74. The skin 53 may comprise, for example and without limitation, a suitable structure, for example structural foam, such as a styrene foam. As will be discussed later in more detail, the stringers 74 and the skin 53 may be integrally formed from the same material such as structural foam, resulting in a skin 53 in the shape of an airfoil that is both structural and stiffened as required for the application, yet is lightweight. The solar collection panel 58 is located on top of the skin 53 and may extend from slightly aft of the leading edge 57 of the wing segment 52 to the trailing edge 59. In other embodiments, the solar panel 58 may cover only a portion of the top surface of the skin 53.

The solar panel 58 may comprise an electrically conductive layer (not shown in FIG. 3) such as copper bonded to an underlying polymer film layer (not shown), such as Mylar. In the illustrated embodiment, the solar panel 58 and the skin 53 may be laminated together into a panel sandwich 192 (see FIG. 33), in which the skin 53 is formed by a core 184, and the solar panel 58 along with later discussed underlying metal stiffeners 188, 190 functions to stiffen the solar panel 58. In other embodiments, the solar panel 58 may be separate from but bonded to the skin 53. The solar panels 58 may be formed of multiple solar cells (not shown) laminated into a single panel conforming to the contour of the skin 53 with relatively low strain levels.

Figure 6:
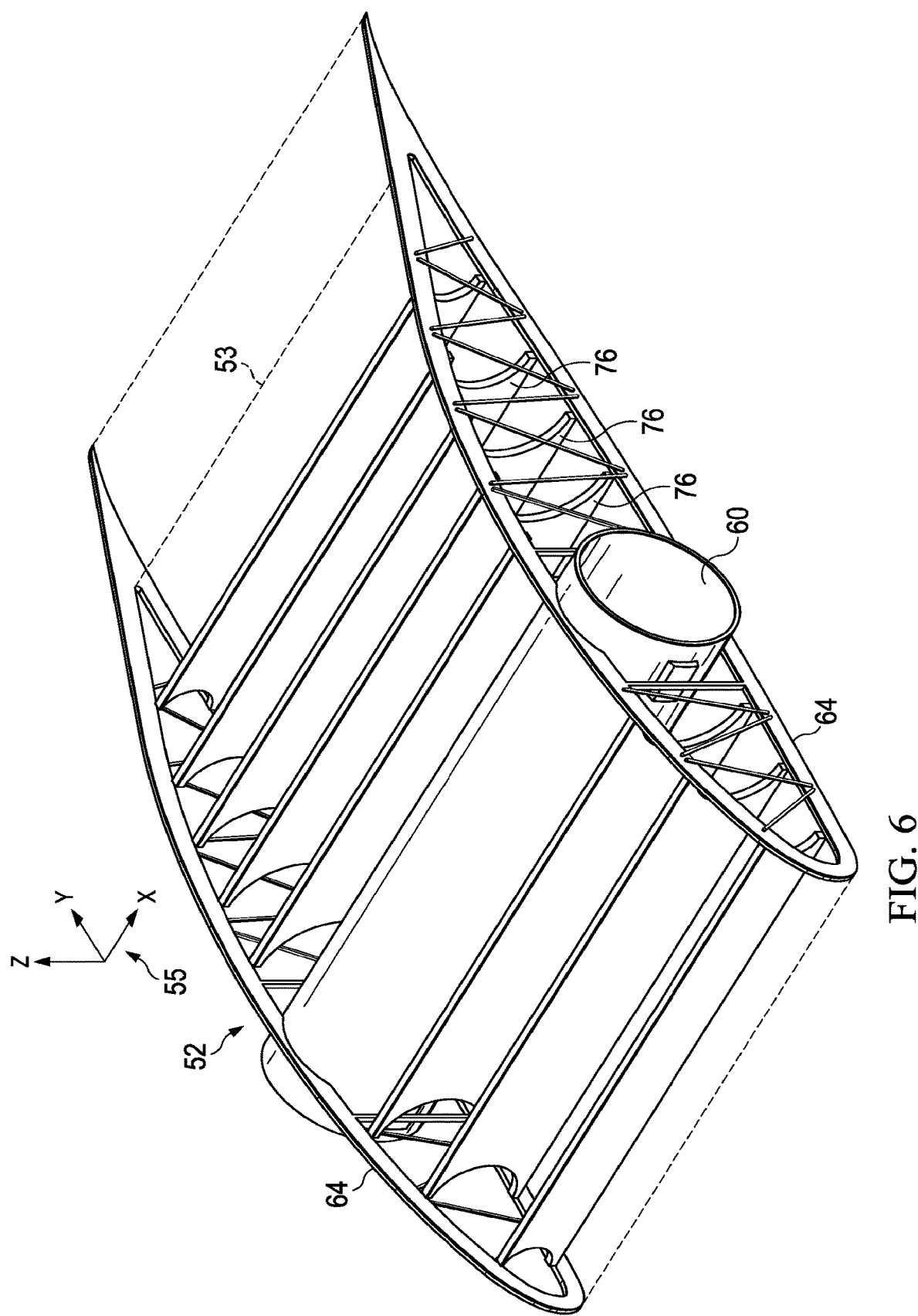
FIG. 6 is an illustration of a wing segment similar to FIG. 3 but showing an alternate form of internal stiffening.

As discussed previously, the wing segment 52 is stiffened as necessary using a desired combination of the stiffness of the solar panel 58, the structural stiffness of the skin 53 and internal stiffeners such as the stringers 74, or the stiffening layers 188, 190 shown in FIG. 33). Where additional stiffening is necessary, the wing segments 52 may include other forms of internal stiffeners. For example, as shown in FIG. 6, full depth spars 76 extending span-wise between the ribs 64 may be employed to provide the wing segment 52 with added rigidity.

FIG. 7 illustrates the ability of the pivotal joints 56 to isolate the wing segments 52 from bending loads imposed by the spar 60 when it flexes in the vertical direction (Z axis 55). In FIG. 7, the undeflected position of the spar 60 is shown in full lines, and its vertically deflected position is shown in broken lines. The two pivotal axes 72 formed by the fore and aft pairs of pivotal joints 56 extend approximately through the neutral axis 68 of the spar 60 and are approximately orthogonal to the primary plane (the XZ plane) of wing flexure. As a result, the distance D between the two pivot axes 72 does not substantially change when the spar 60 deflects vertically. In addition, because the wing segment 52 pivots about only two axes 72 relative to the spar 60, the wing segment 52 is substantially isolated from bending loads imposed on the wing segment 52 by flexure of the spar 60.

FIG. 8 is a rear view of the wing 50, illustrating flexure of the wing 50 in the vertical direction (Z axis). Each wing segment 52 assumes the angle θ of that portion of the spar 60 on which it is pivotally supported, while remaining substantially undistorted by the vertical wing deflection.

Figure 9:
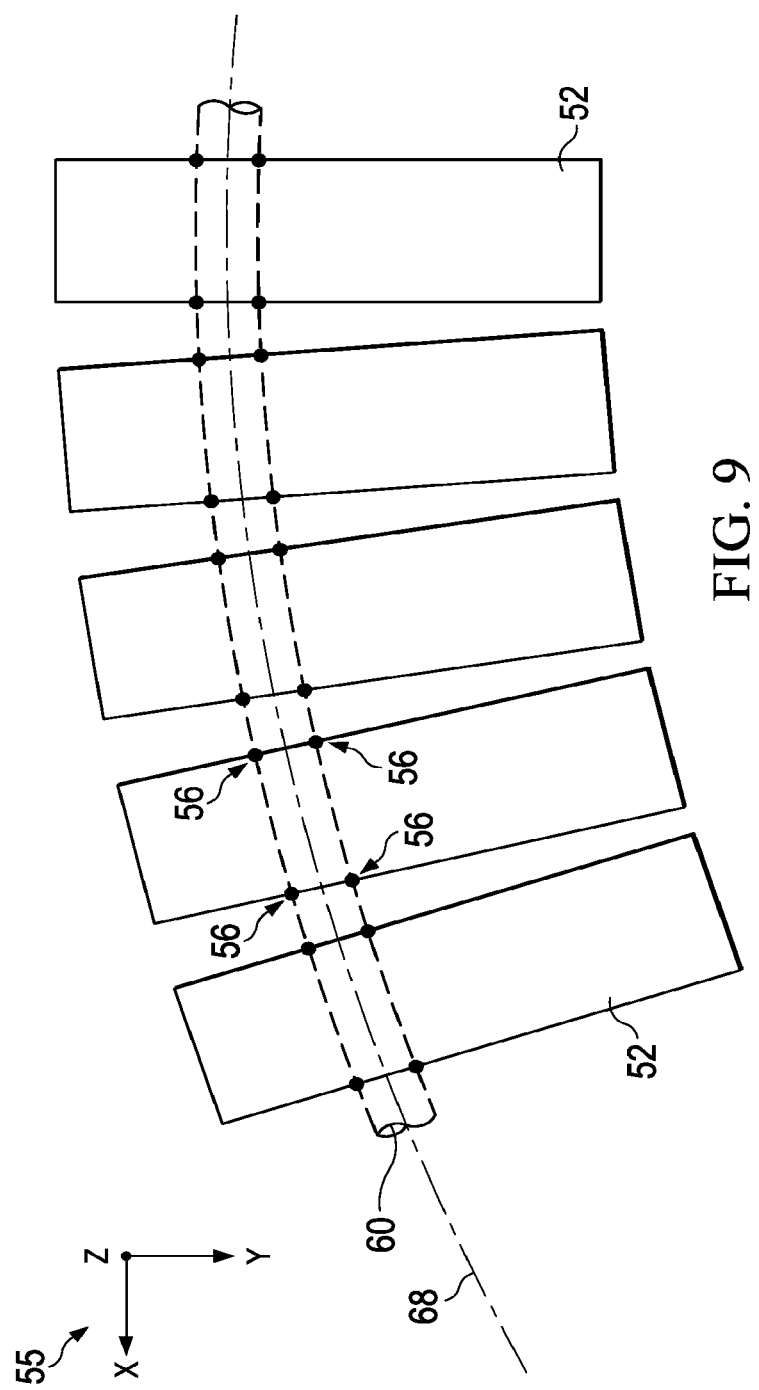
FIG. 9 is an illustration of a plan view of the segmented wing, flexed in the chord-wise direction, and showing the individual wing segments having pivoted to conform to the chord-wise curvature of the spar.

FIG. 9 is a top view of several of the wing segments 52 showing the locations of the fore and aft pairs of the pivotal joints 56 during an aft deflection 60 of the wing spar 60 in the XY plane. The wing segments are substantially isolated from strains produced by curvature of the spar 60 in the XY plane as a result of slight flexure of the rib brackets 56 shown in FIGS. 3, 4 and 5. Other than the slight deflection of the rib brackets 66, the wing segments 52 remain substantially undeformed by the aft flexure of the wing spar 60.

Figure 10:
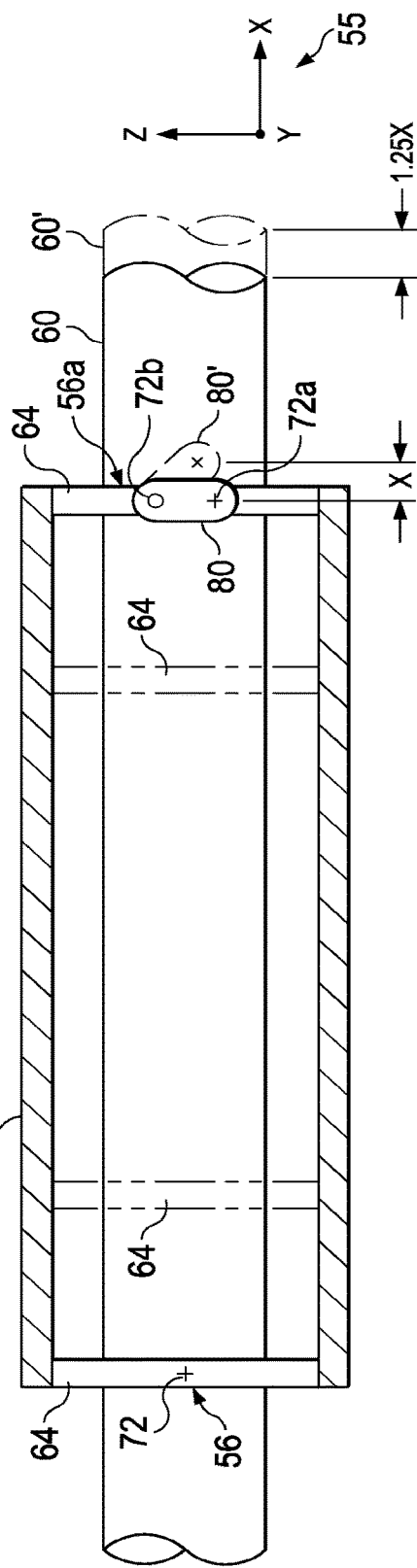
FIG. 10 is an illustration of a diagrammatic front view of an alternate embodiment of the wing segment in section, showing a pivotal link and longitudinal expansion of the spar.

FIG. 10 illustrates an alternate technique for pivotally mounting each of the wing segments 52 on the spar 60. In this embodiment, one side of the wing segment 52a is mounted by pivotal joints 56 to the spar 60 for pivotal movement about a fixed axis 72 (shown as a point extending into the paper as viewed in FIG. 10), as previously described. However the fore and aft pivotal joints 56a on the other side of the wing segment 52 each includes a double pivoting link 80 having its opposite ends pivotally connected, respectively to a rib 64 of the wing segment 52 and the spar 60. The pivoting link 80 pivots about dual axes 72a, 72b, allowing relative movement between the wing segment 52 and the spar 60 in the span-wise direction (X axis). The accommodation of this relative span-wise movement effectively isolates the wing segment 52 from loads imposed in the wing segment 52 caused by relative thermal expansion between the wing segment 52 and the spar 60. The loads resulting from this thermal expansion may be caused by, for example and without limitation, temperature swings and/or different CTE's of the materials used to fabricate the wing segment 52 and the spar 60. For example, when the spar 60 expands in length to the broken line position shown at 60', the link 80 pivots to position the position shown at 80', allowing movement of the spar 60 in the span-wise direction relative to the segment 52. Other types of pivotal joints 56a may be possible, such as a pivotal pin (not shown) on the wing bracket 64 that extends into a substantially span-wise slot (not shown) formed on the wing spar 60.

Figure 3:
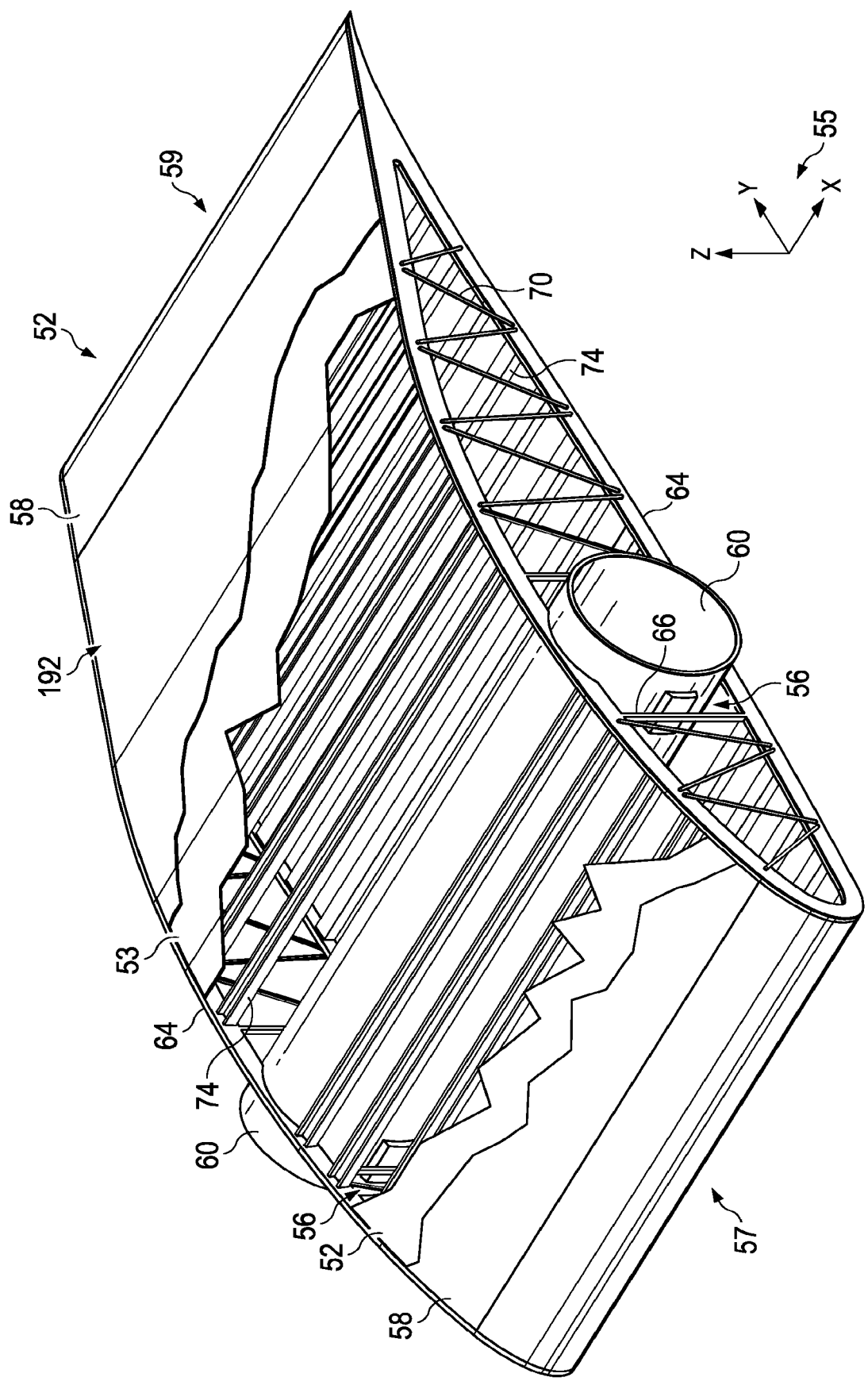
FIG. 3 is an illustration of a perspective view of one of the wing segments shown in FIG. 1, parts of the solar panel and the wing skin being broken away for clarity.

It should be noted here that while the rib brackets 64 are shown at the outboard edges of the wing segments 52 in FIGS. 7 and 10, it may be desirable in some applications to mount the rib brackets 64 slightly inward from the outboard edges of the wing segment 52, as shown by the broken lines 64 in FIG. 10. Positioning the rib brackets 64 inward from the outer edges of the wing segment 52 may substantially reduce the deflection of the wing segment 52 due to aerodynamic loads, which in turn may permit using lighter materials for the wing skin 53 (FIG. 3).

Figure 11:
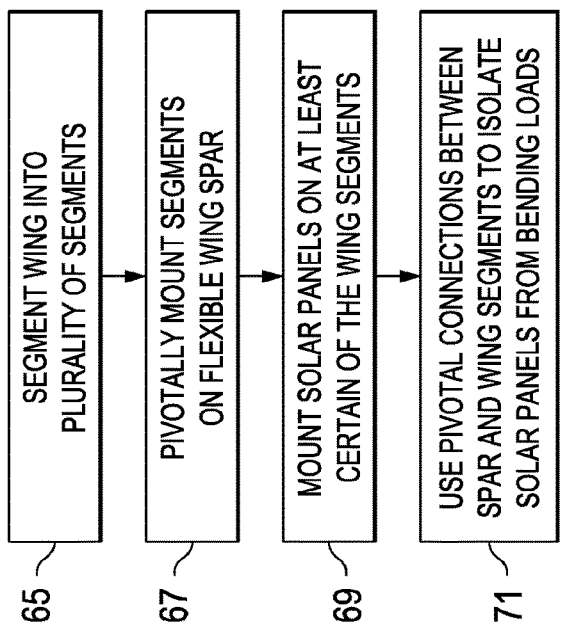
FIG. 11 is an illustration of a flow chart of a method of reducing loads on an aircraft wing.

FIG. 11 illustrates a method of reducing loads on an aircraft wing 50, using the wing segmentation and pivotal joints 56 described above. Beginning at step 65, the wing 50 is segmented into a plurality of separate wing segments 52, and at 67, the wing segments 52 are pivotally mounted on a wing spar 60 using pivotal joints 56. At 69, solar panels 58 are mounted on at least certain of the wing segments 52. At step 71, the pivotal joints 56 are used to isolate the wing segments, and thus the solar panels 58 from bending loads imposed by the flexing of the wing spar 60.

Figure 13:
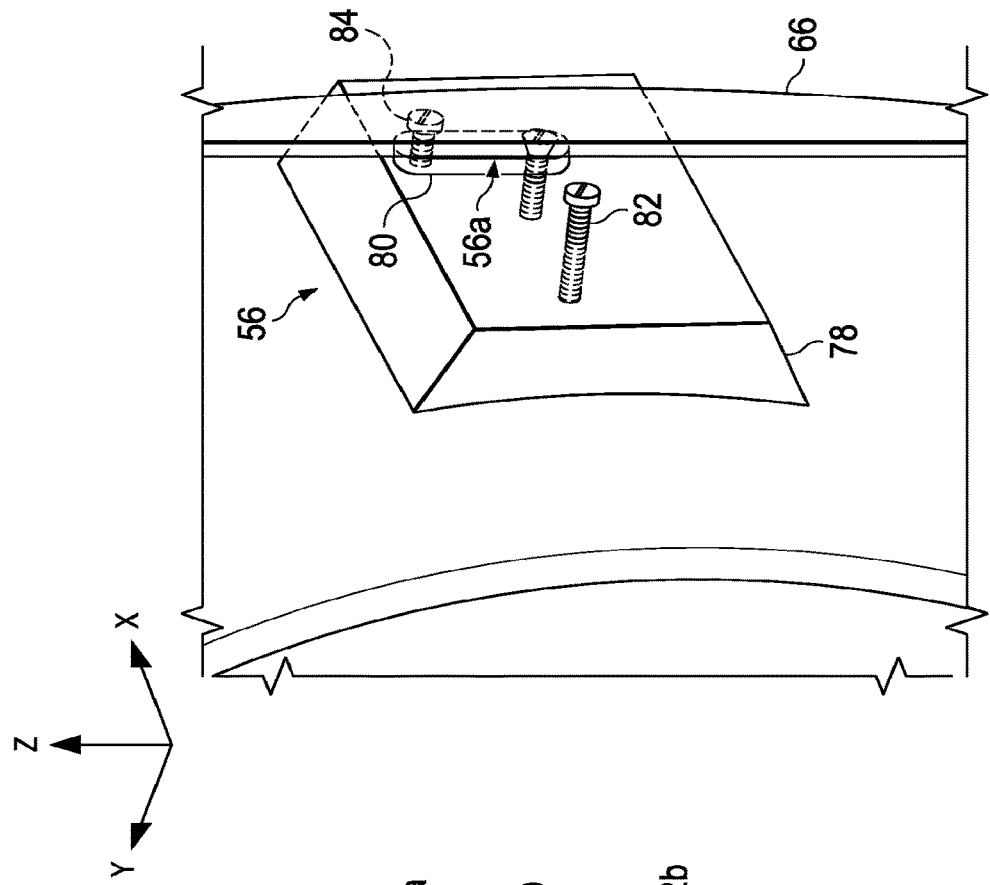
FIG. 13 is an illustration of a perspective view of the pivotal joint shown in FIG. 12.
Figure 12:
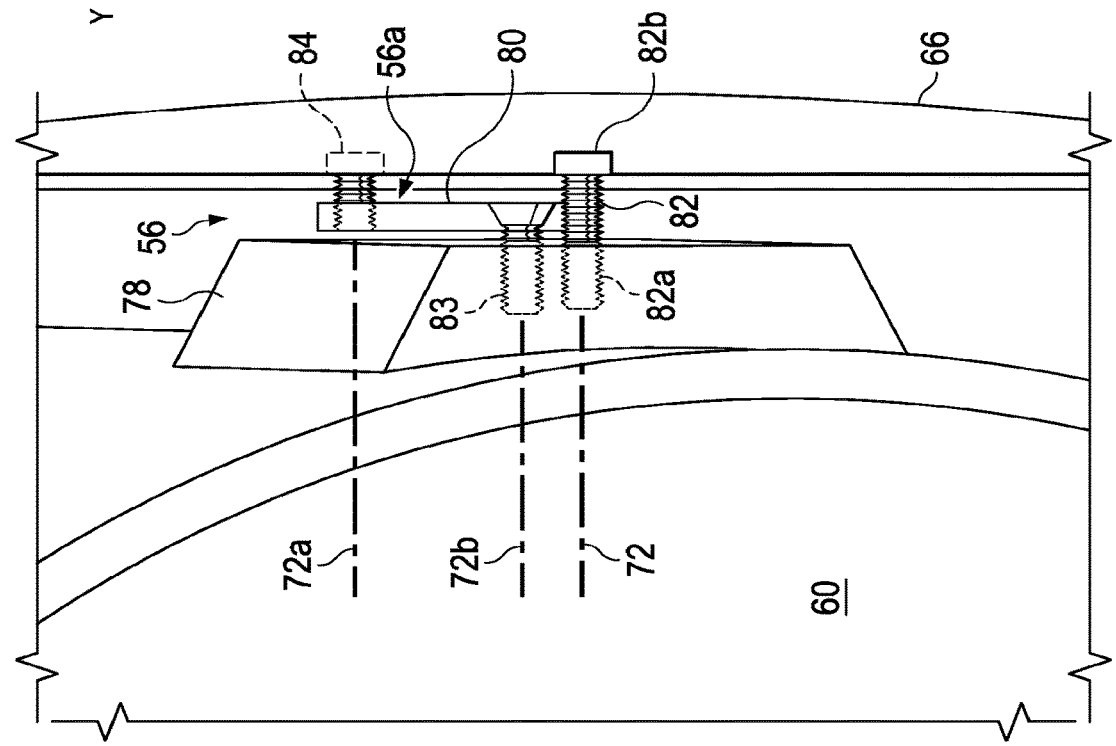
FIG. 12 is an illustration of a trimetric view of a pivotal joint between the wing spar and one of the rib brackets on a wing segment, the rib bracket of the adjoining wing segment not shown for clarity.

Attention is now directed to FIGS. 12 and 13 which illustrate additional details of the pivotal joints 56. 56a. Attachment blocks 78 are mounted on the spar 60 at locations aligned with the rib brackets 66 of adjoining ones of the wing segments 52. A pivot pin 82 has one end 32a thereof secured to the attachment block 78 while a head 82b on the opposite end of the pin 82 is rotatably mounted to a rib bracket 66 of an adjoining wing segment 52. A second pivot pin 83 is mounted on the attachment block 78, laterally spaced in the span-wise direction from the first pivot pin 82. One end of the pivoting link 80 is attached to the second pivot pin 83 while the opposite end of the link 80 is pivotally attached to a third pin 84 that is secured to one of the rib brackets 66. The attachment block 78 may be formed of any suitable, rigid lightweight material, such as carbon fiber and the pins 82, 83, 84 as well as the pivoting link 80 may be formed of a suitable lightweight metal such as aluminum. Other materials are possible. As previously mentioned other types of joints allowing relative movement between the wing segments 52 and the wing spar 60 are possible. For example, this relative movement could be accomplished using a joint comprising a roller (not shown) mounted on the rib 64 which is free to move within a longitudinal slot (not shown) formed in the spar 60.

Referring now to FIG. 14, in order to reduce air turbulence between adjoining wing segments 52a, 52b and thereby maintain aerodynamic properties of the wing 50, a cover or closure 86 spans the variable gap 54 between, and overlaps adjoining segments 52, e.g. 52a, 52b, along the entire length of the gap 54. The cover 86 aerodynamically links the adjoining wing segments 52 so that the multiple segments 52 function as a single aerodynamic surface. The cover 86 provides for relative motion between adjoining wing segments 52, primarily in the span-wise direction however the cover 86 may also accommodates wing flexure in the vertical and/or horizontal planes. The cover 86 may be formed of a flexible material that will also accommodate relative torsional flexing of adjacent wing segments 52, along with simultaneous wing segment flexing in the horizontal and vertical planes. This motion may also be caused by differential thermal expansion, or a combination of wing flexure and differential thermal expansion. It may be especially important to avoid disruption to aerodynamic air flow in the chord-wise direction (Y axis) of the wing 50, although disruptions in the span-wise direction (X axis) may also be important, to a lesser degree.

Referring particularly to FIG. 15, in one embodiment, the cover 86 may comprise a wiper 87 having upper and lower forks 92, 95 respectively spaced apart to form a slot 96. The wiper 87 may be formed of any suitable, lightweight material fabricated by molding, extrusion or other processes. One edge 102 of the wiper 87 is secured to one of the segments 52b between the skin 53 and an associated solar panel 58b. The solar panel 58a of the adjoining wing segment 52a is received within the slot 96, essentially forming a tongue and groove type of inter-connection. The wiper 87 may be fabricated such that the depth d of the slot 96 is slightly less than the thickness t of a cantilevered edge 98 of the solar panel 58a, resulting in pre-tensioning of the wiper 87 against the solar panel 58a which reduces air leakage and reduces airflow disruption over the wiper 87. The upper fork 92 of the wiper 87 engages and is loaded against solar panel 58a by the pre-tension, while the lower fork 95 is received within a slot 88 between skin 53 and solar panel 58a. The opposite edges 100 of the upper fork 92 may be tapered to improve the aerodynamic properties of the cover 86. The lower tine 95 may include a tapered edge 95a to facilitate initial assembly of the cover between the panels 58a, 58b. The outer edge 98 of the solar panel 58a slides within the slot 96 as the wing segments 52a, 52b move in the span-wise due to flexing of the spar (FIG. 1) and/or thermal expansion during temperature swings.

A substantially air impermeable membrane 104 beneath the wiper 87 is held by cylindrical seals 106 that are press-fit into grooves 108 in the ends of the adjoining wing segments 52a, 52b and forms a generally air-tight enclosure within the wing 50. The membrane 104 may be formed of any suitable stretchable elastic material, such as an elastomer. The membrane 104 functions to prevent air leakage through the wiper 87 which occur because of differential pressure between the upper and lower surfaces 73, 77 (FIG. 14) of the wing 50. Other types of stretchable sealing structures (not shown) may be used to span the gap 54 beneath the cover 86 in order to prevent air leakage through the gap 54, including an elastomeric filler placed in the gap 54 between the wing segments 52 and having an upper surface that is substantially level with the solar panels 58.

FIGS. 16 and 17 illustrate an alternate form of the cover 86. In this embodiment, the cover 86 comprises a stretchable, elastic and flexible membrane 110 that may include tapered edges 112 to improve aerodynamic properties. The membrane 110 may be bonded to the upper surfaces 63 of the adjoining solar panels 58a, 58b, spanning the variable width gap 54. The membrane 110 may be formed of any suitable elastic material that stretches when the adjoining segments 52a, 52b move 90 away from each other, increasing the width of the gap 54' as shown in FIG. 17, and contracts when the adjoining segments 52a, 52b move toward each other. Depending on the type of flexing being experienced by the wing 50, some portions of the membrane 110 may stretch and other portions contract, while still other portions of the membrane 110 may twist during torsion of the wing 50. Because of the elastic nature of the flexible membrane 110, any distortion of the membrane 110 caused by stretching, contracting or twisting will be temporary and limited to the period during which the wing 50 is flexing.

Figure 18:
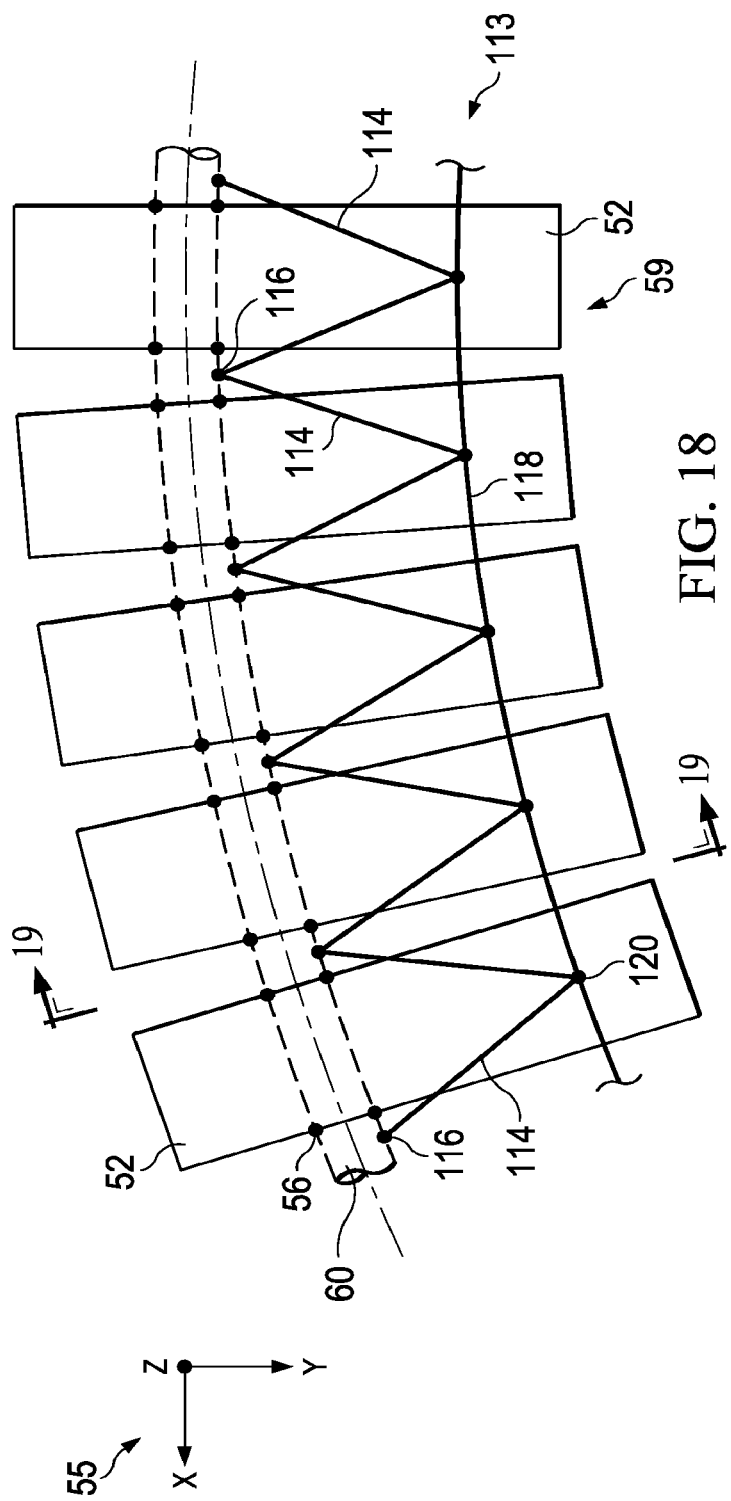
FIG. 18 is an illustration of a plan view of an alternate form of the segmented wing stiffened by bracing.
Figure 19:
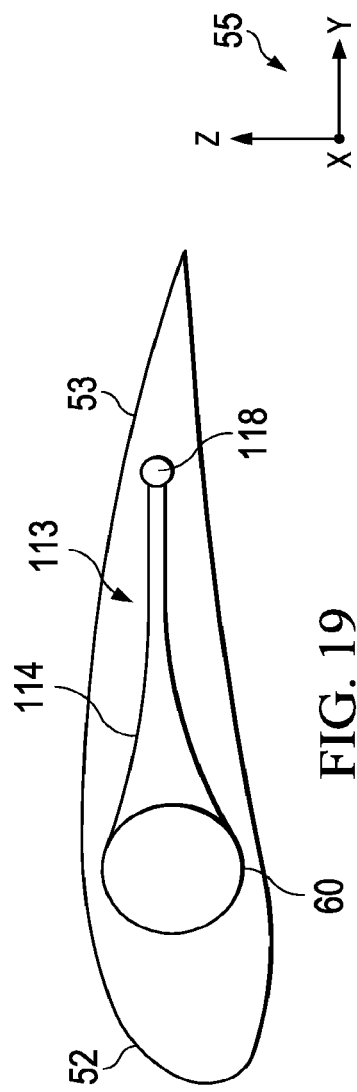
FIG. 19 is an illustration of a sectional view taken along the line 19-19 in FIG. 18.

Referring now to FIGS. 18 and 19, drag and/or thrust loading of the wing 50 may result in bending stresses being applied to the spar 60 which deflect the spar 60 in the XY plane, as shown in FIG. 18. In order to reduce these bending stresses it may be advantageous in some applications to stiffen the spar 60 by means of bracing 113. The bracing 113 may comprise, for example and without limitation, chords 114 having their opposite ends 116, 120 respectively attached to the spar 60 and a trailing edge bar 118. The chords 114 may comprise lightweight rigid members or non-stretchable wires that are held in tension between their opposite ends 116, 120 to provide the wing 50 with the required rigidity. In alternate embodiments (not shown), an aft chord of the bracing 113 may function as the trailing edge 59 of the wing segments 52.

Figure 22:
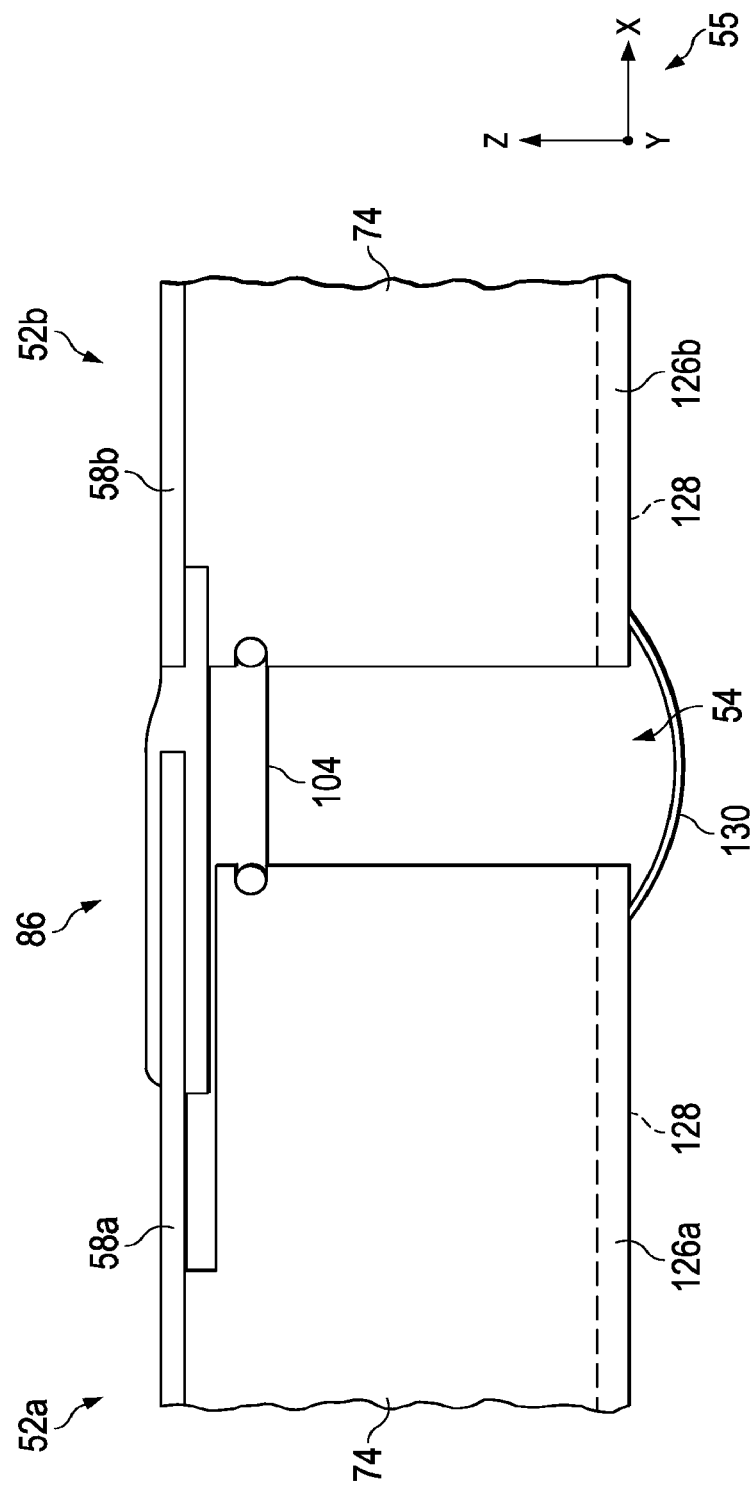
FIG. 22 is an illustration of a sectional view taken along the line 22-22 in FIG. 21.

Attention is now directed to FIGS. 20-22 which illustrate an alternate embodiment of a wing segment 52 having a multifunctional stiffening structure that both provides the wing segment 52 with the necessary rigidity and strength, and optionally, may function to collect, conduct and route electrical power generated by the solar panels 58. Wing segment 52 includes a airfoil shape 53 defining upper and lower skin panels 53a, 53b. The structural arrangement of the upper skin panel 53a wraps around the leading edge 57 of the wing segment 52 and may comprise for example without limitation, a structural foam having integrally formed stringer blades 74 also formed of foam which extend in the span-wise direction. Lightweight materials other than foam are possible, depending on the application. The illustrated wing 50 is particularly suited for very lightweight aircraft applications, however, it should be noted here that the principals of the disclosed embodiments may be employed with other aircraft applications where weight is not a significant design factor. In such other applications, it may be possible to fabricate various components of the wing segments 52, including but limited to the skin 53, from other materials, including but limited to lightweight materials such aluminum, titanium, and/or laminated composites. The solar panel 58 (FIG. 21) is laminated to the skin 53 and assists in stiffening the upper skin panel 53a and protecting it. The wing segment 52 may be further stiffened by a rear spar 124 located aft of the main spar 60, near the trailing edge 59 of the wing segment 52 and extending in the span-wise direction.

As previously mentioned, blade type stringers may be formed integrally with the upper skin 53a. Stringers having other cross sectional shapes are possible. Each of the stringers 74 includes a lower cap 126 having an embedded or attached, substantially rigid elongate member such as a rod 128 running the length of the stringer 74. In one embodiment, the rod 128 may comprise a composite such as a pultruded carbon rod, while in other embodiments, the rod 128 may be an electrically conductive material such as copper or aluminum. When an electrically conductive material is chosen for the rod 128, the rods 128 may provide the dual function of stiffening the upper chord 53a of the wing segment 52 while acting as a conductive path for collecting and routing power generated by the solar panels 58. The electrically conductive rods 128 of the adjoining wing segments 52 may be connected together, as shown in FIG. 22 by a flexible wire conductor 130 that spans the gap 54 and is secured as by soldering or other suitable joining techniques to the ends of the rods 128. The rods 128 may be electrically connected to the solar panel 58 by wires (not shown) or though the wing ribs 64 (FIG. 3) of the wing segment 52, as will be discussed later in more detail. In a further embodiment (not shown), the membrane 104 may comprise an electrically conductive metal foil that may be used to electrically connect adjacent solar panels 58. The rods 128 are shown as having a circular cross sectional shape, however, other rigid, elongate reinforcing members with other cross sectional shapes are possible.

Figure 23:
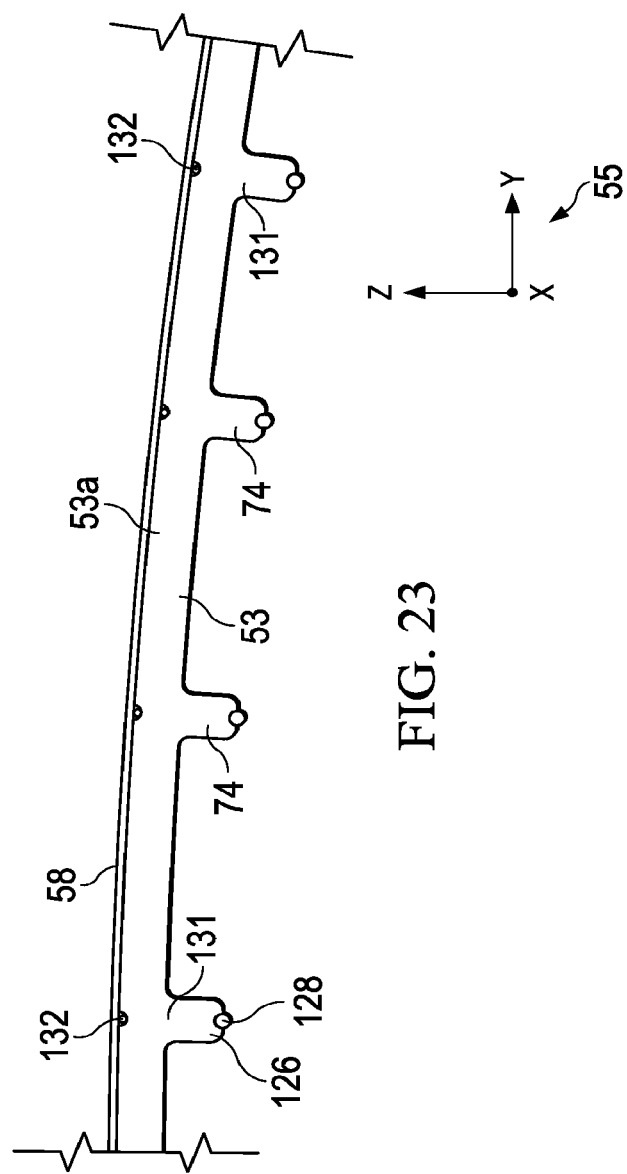
FIG. 23 is an illustration similar to FIG. 21 but showing an alternate form of the blade stringers, each stiffened by a pair of rigid rods.

FIG. 23 illustrates an alternate embodiment of the upper chord 53a in which rigid rods 132 are placed on the upper caps 131 of each of the stingers in order to provide the upper chord 53a with additional stiffness.

Figure 26:
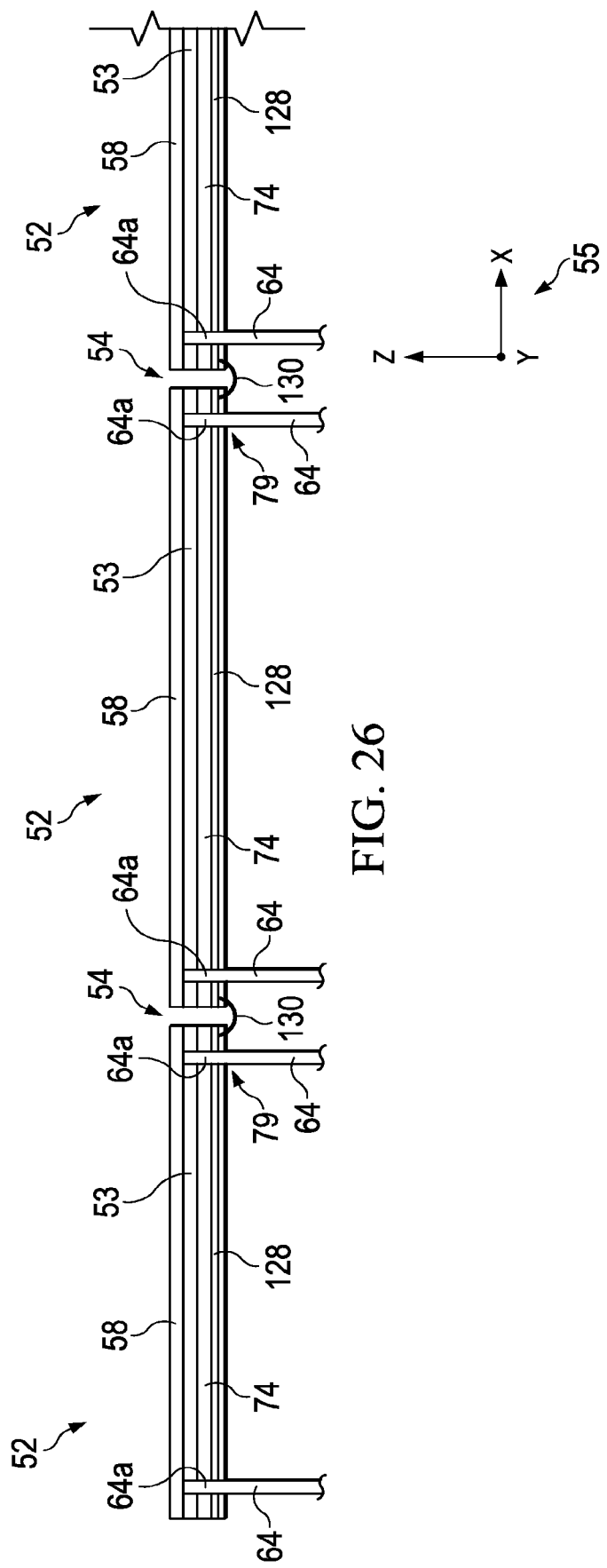
FIG. 26 is an illustration of a sectional view taken along the line 26-26 in FIG. 24.

Attention is now directed to FIGS. 24-26 which illustrate another embodiment of the wing ribs 64. At least one of the wing ribs 64 of each segment 52 may have an upper cap 64a that is partially or completely formed of an electrically conductive material such as, without limitation, aluminum, and a lower cap 64b formed of electrically non-conductive material such as, without limitation, a carbon fiber composite. In FIG. 24, the conductive upper cap 64a is electrically connected to the electrically conductive wing spar 60 by metallic tubes 144 which may comprise, for example and without limitation, aluminum. In this example, electricity is routed from the solar panels 58 through the upper caps 64a and metal tubes 144 to the spar 60, and through the spar 60 to the regulators 134 (FIG. 2). The upper cap 64a may thus function as a collector or manifold 79 for collecting and routing electricity generated by the solar panels 58, to a single or smaller number of points, e.g. rods 128, or to a single point 83 (FIG. 24) located either on the spar 60 or near the trailing edge 59.

FIG. 25 illustrates one embodiment of the upper cap 64a. The upper cap 64a includes a lightweight electrically conductive web 85 which is electrically connected with inner metallic elements such as the conductive rods attached to the blade stringers 74 shown in FIG. 21. In those embodiments where the entire upper cap 64a is electrically conductive, the possible weight penalty resulting from the use of metal as the rib material may be offset by a reduced voltage loss due to the increased conductive cross sectional area of the upper rib cap 64a compared to a wire that could otherwise be used.

FIG. 26 illustrates multiple wing segments 52 having ribs 64 that use the upper caps 64a to collect and route electricity generated by the solar panels 58. The upper rib caps 64a may be directly electrically connected to the solar panels 58 and conduct electricity to the electrically conductive rods 128 attached to stringers 74. The rods 128 of the adjoining segments 52 are connected by wire conductors 130 spanning the gaps 54 between the segments 52. Although not shown in the Figures, it may be possible to use the wing spar 60 as a conduit for the conductors 130 between the wing segments 52, enclosing and thereby protecting the wire conductors 130.

When mounting the solar panels 58 on the underlying wing structure, such as the skin 53 and ribs (FIG. 2), it may be desirable to substantially match the CTE's of the solar panel 58 to that of the underlying structure as closely as possible, as will be discussed later in more detail. Thus, when choosing a construction for the upper rib caps 64a, a similar CTE matching process can be used to tune the CTE of the upper rib cap 64a to the corresponding CTE of the combination of the solar panel 58 and the skin 53, in the chord-wise, Y-axis direction.

Figure 27:
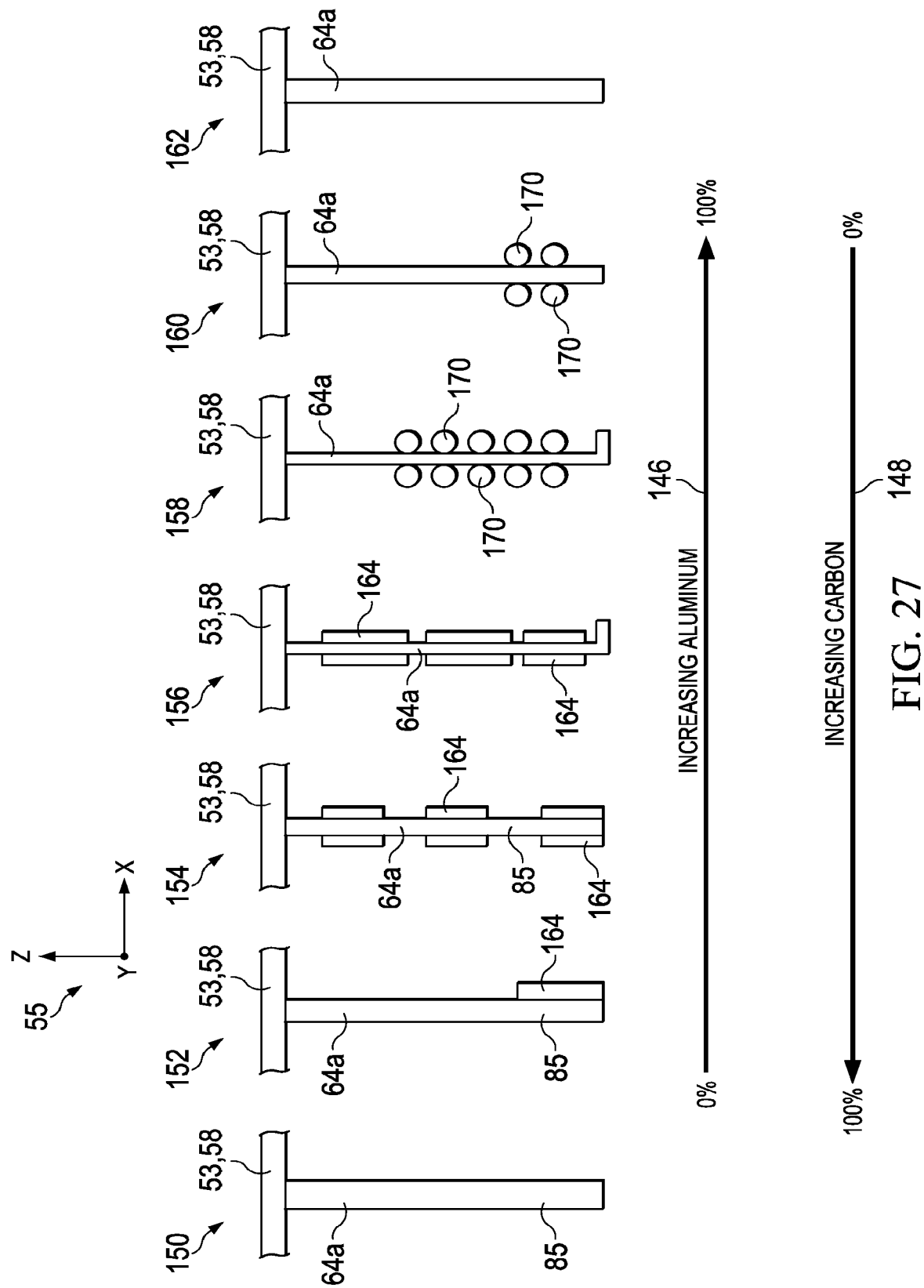
FIG. 27 is an illustration of a cross sectional view of the upper chord of the ribs in FIGS. 24-26, showing alternate material combinations and geometries.

FIG. 27 illustrates several possible embodiments of the upper rib cap 64a that may result from this tuning process, ranging from 100% aluminum 146 to 100% carbon 148. At end of the range shown at 150, the upper rib cap 64a may be constructed entirely from non-conductive material which in the illustrated example is carbon or plastic, while at the other end of the range shown at 162, the upper rib cap 64a may be constructed entirely of an electrically conductive metal, which in the illustrated example, is aluminum. The construction alternatives shown at 152 and 154 employ a carbon web 85 to which there is attached one or more flat aluminum conductors 164. In contrast, the construction alternatives shown at 158 and 160 employ an aluminum web to which there is attached one or more carbon reinforcing rods 170. The value of the combined CTE's of the constituents of the upper rib cap 64a may be any value between that of carbon and aluminum depending on the relative cross sectional areas of carbon and aluminum used. In some applications, the use of aluminum as the upper rib cap 64a may be advantageous from a thermal expansion viewpoint, since the CTE of a solar panel 58 employing a copper base layer is relatively close to that of an aluminum upper rib 64a. This particular choice of materials may minimize the upward or downward bowing of the upper wing surface resulting from changes in temperature. Where carbon and aluminum are used in the upper and lower caps 64a, 64b respectively, it may be desirable to apply a suitable coating (not shown) on one or both of them to prevent the possibility of galvanic corrosion of the aluminum.

Figure 28:
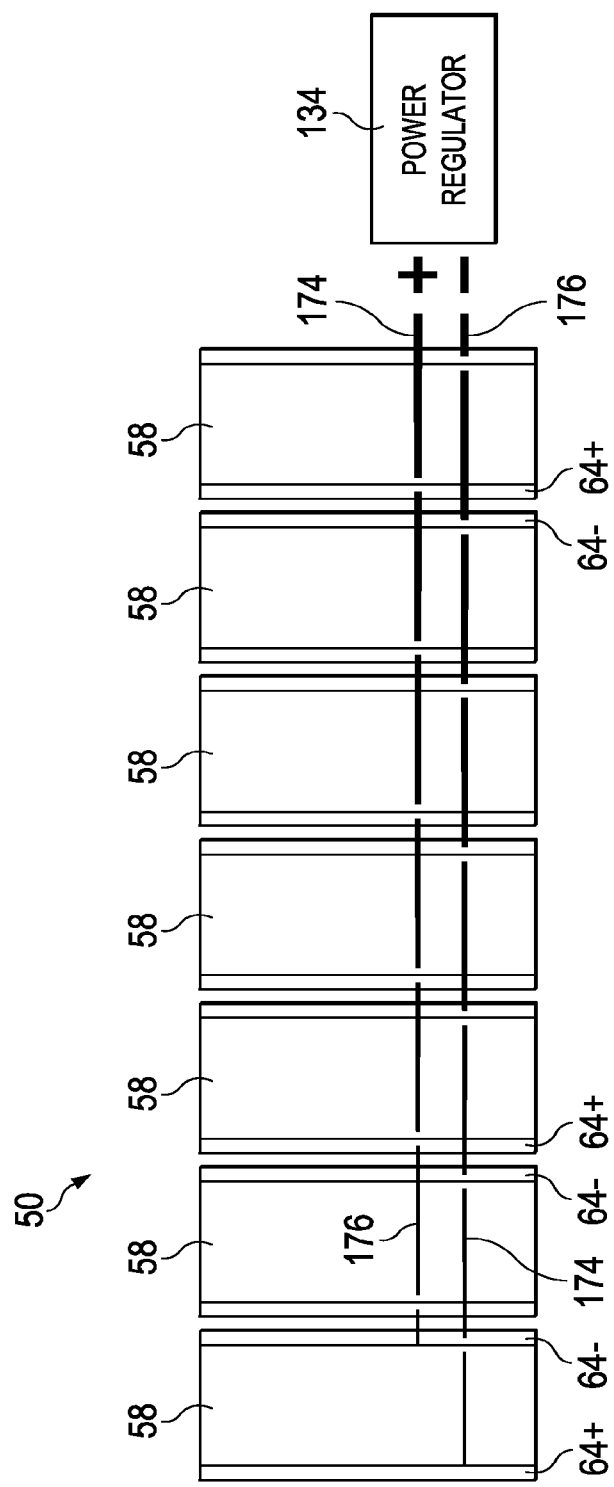
FIG. 28 is an illustration of a diagrammatic plan view of a segmented wing, showing manifolding of the electrical power generated by the solar panels.

Referring now to FIG. 28, manifolding the electricity from the solar panels 58 to central conductors 174, 176, which may comprise a larger wire or bus attached to the spar 60 (FIG. 24), may be advantageous because the gauge of the conductors 174, 176 may be successively increased to carry the additional current as the location of the conductors 174, 176 varies across the span. In the embodiment shown in FIG. 28, one of the upper rib caps 64+ of each of the wing segments 52 is attached to the positive side of the solar panels 58, while the other rib cap 64− is attached to the negative side of the solar panel 58.

Figure 29:
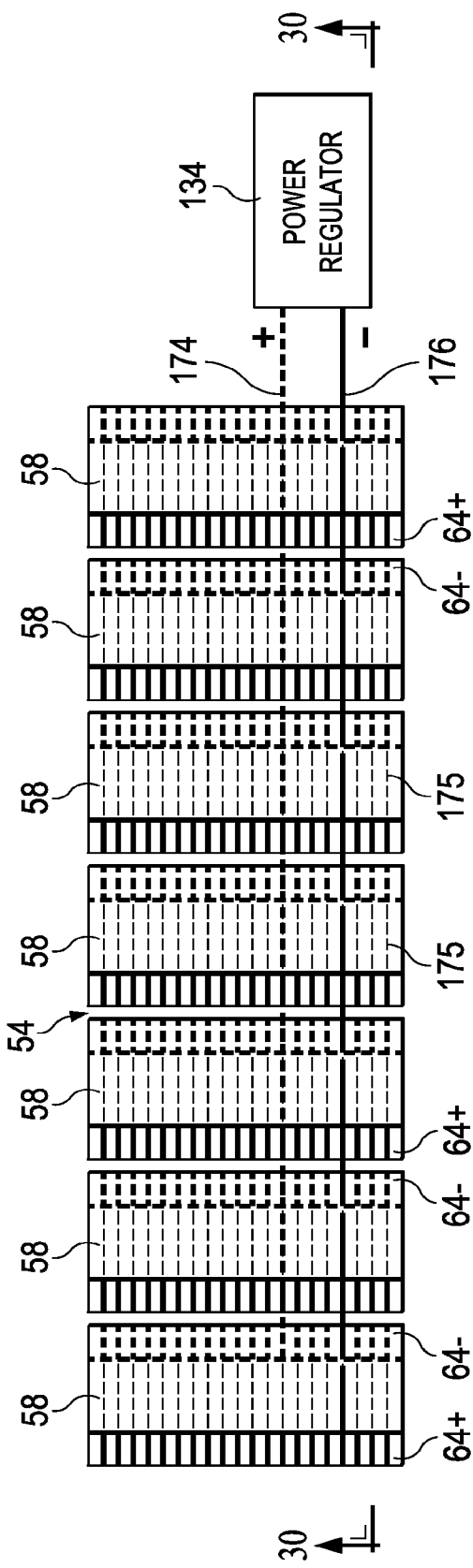
FIG. 29 is a view similar to FIG. 28, but showing one arrangement of the positive and negative leads of the solar panels to carry electrical current from the edge of each solar panel to the ribs.
Figure 30:
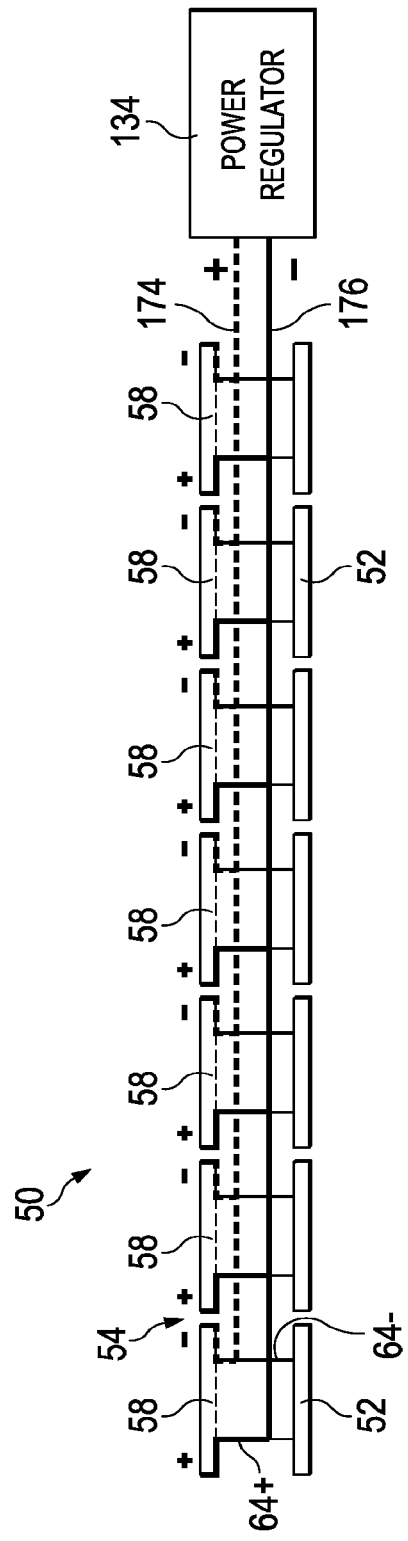
FIG. 30 is an illustration of a sectional view taken along the line 30-30 in FIG. 29.

As shown in FIGS. 29 and 30, it may be advantageous in some applications to place the wing ribs 64 for each wing segment 52 at locations laterally spaced inboard within the wing segment 52. For uniformly distributed loads, a desirable proportion is 2L/9, 5L/9, and 2L/9, as illustrated in FIG. 29. For this arrangement, the positive and negative wires 175 in each of the wing segments 52 may be arranged such that they carry current from the edge of the solar panel 58 to a corresponding wing rib 64+, 64−, which in turn carry the current to the central conductors 174, 176 which are electrically insulated from the positive and negative wires 175.

Figure 31:
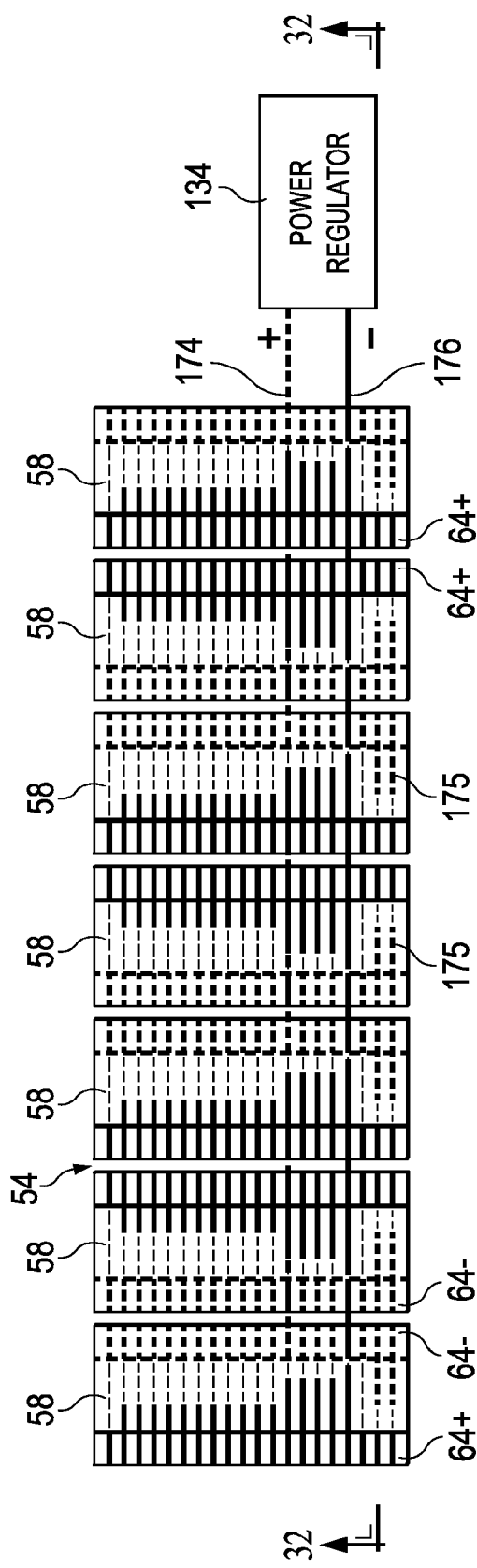
FIG. 31 is an illustration similar to FIG. 29, but showing a polarity arrangement that avoids adjacent placement of the positive and negative leads of the solar panels.
Figure 32:
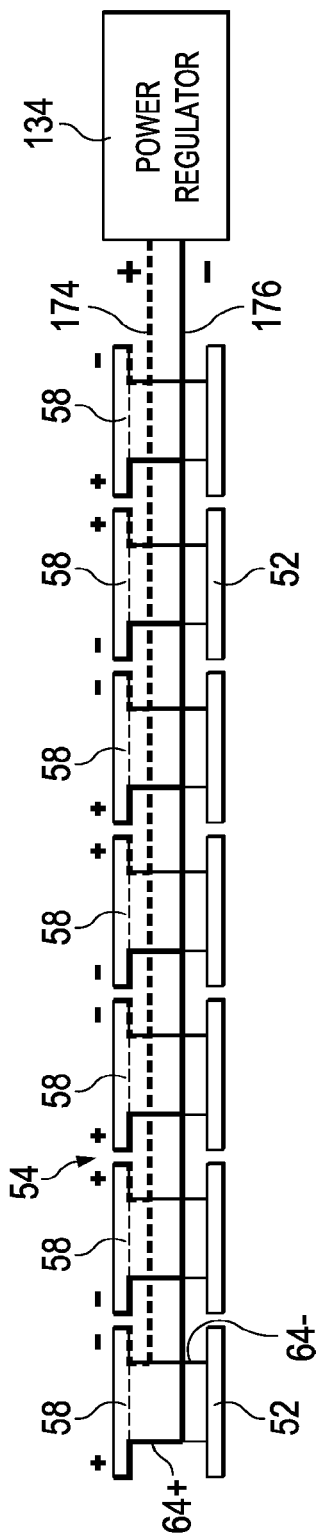
FIG. 32 is an illustration of a sectional view taken along the line 32-32 in FIG. 31.

In some applications, the voltage potential in the gaps 54 between the wing segments 52 may be great enough to cause an arc-over between the segments 52. As shown in FIGS. 31 and 32, this problem may be overcome by arranging the solar panels 58 in left and right-hand versions, such that the positive and negative sides of the solar panels 58, and the upper rib caps 64+, 64−, are not adjacent to each other.

Referring now to FIG. 33, the panel sandwich 192 previously discussed in connection with FIG. 3, includes solar panel 58 comprising a rigid copper cell layer 178 on a soft Mylar substrate 180, laminated by an adhesive layer 182 to a core 184. The core 184 may comprise any of a number of lightweight materials, such as, without limitation, styrene foam as previously discussed. The upper skin panel 53a is stiffened by the solar panel 58 and stiffener layers 188 and 190 being separated by the core 184. The stiffener layers 188, 190 may comprise, for example and without limitation, the metal and/or carbon rods 128, 132 shown in FIG. 23. Both the copper cell layer 178 and the Mylar substrate 174 are typically relatively thin. For example, typical values of thicknesses for the layers 178 and 180 are 0.001 inches for the copper cell layer 178 and 0.002 inches for the Mylar substrate 180. In one embodiment, the core 184 may be a relatively lightweight foam, on the order of approximately 0.1 to 0.3 inches thick which forms the skin 53. The solar panel 58 and the stiffener 194 effectively form a pair of facesheets 185, 187 between which the core 184 is sandwiched.

Referring now to FIG. 34, mis-matches between the CTE's of the solar panel 58 and the stiffener 194 of the wing panel sandwich 192 may result in undesirable upward bowing 192b or downward bowing 192b of the sandwich 192 under thermal loading. This bowing can change the airfoil shape of the wing segment 52, which can be disadvantageous because as the amount of bowing increases, the aerodynamic performance of the wing 50 may decrease. This bowing may also have undesirable effects on the solar panel 58.

In accordance with the disclosed embodiments, an aircraft wing may be fabricated using the method illustrated in FIG. 35. At step 195 an airfoil shape for a wing is selected, and at 197 a wing panel sandwich is formed, such as the sandwich 192 shown in FIG. 33. The wing panel sandwich 192 may be formed by laminating a core 184 between a pair of facesheets 185, 187 (FIG. 33) respectively comprising upper reinforcement layers 178, 180, and lower reinforcement layers 188, 190. At step 199, the CTE's of the sandwich panel layers 178, 180, 188, 190 are selected and matched relative to each other such that the combined CTE of the stiffener layers 188, 190 (i.e. stiffen 194) is generally equal to that of the solar panel 58, in order to achieve the desired airfoil shape during flight. The airfoil shape of the wing segments 52 (FIG. 3) is determined in part by the amount of bowing or deflection of the wing panel sandwich 192. This bowing or deflection may be controlled and maintained within desired limits by tuning the material properties and/or thicknesses of the layers 178, 180 forming the solar panel 58 with the layers 188, 190 of the stiffener 194 such that there is substantially no difference in the CTE's of these two groups of layers. In other words, the combined CTE of the stiffener layers 188, 190 are matched to those of the combined CTE of layers 178, 180. For example, and without limitation, this CTE tuning/matching may be achieved through the selection of the particular materials used in either or both of the stiffener layers 188, 190, and/or by selection of the thickness of the stiffener layers 188, 190, or by the selection of the number of layers forming the stiffener 194. Similarly, the matching of the CTE's may include the choice of materials used in, and/or the selection of the thicknesses of the layers 178, 180 forming the solar panel 58. In some applications, it may also be necessary to take into consideration the CTEs of the adhesive layers 182, 186, depending on their composition and respective thicknesses. In addition, the CTE of the core 184 may also be taken into consideration.

In some applications, changes in thicknesses of the two layers 178, 180 of the solar panel 58 may be easily adjusted, as needed. In this case, it may be necessary to employ only a single stiffer layer 188 or 190 to achieve a zero vertical deflection under a change in temperature. However, it is possible that changing the ratio of the thicknesses of the solar panel layers 178, 180 may be difficult, because the process to manufacture the solar panel layers 178, 180 may depend on maintaining these layers having at a certain thickness. If this is the case, the geometry and materials of layer 178, 180 may remain fixed due to the production process, and the CTE tuning process may be applied to the stiffener layers 188, 190 instead. Thus, the thickness and materials of one or more of the stiffener layers 188, 190 are adjusted to match the combined coefficient of thermal expansion of the solar panel 58.

Figure 36:
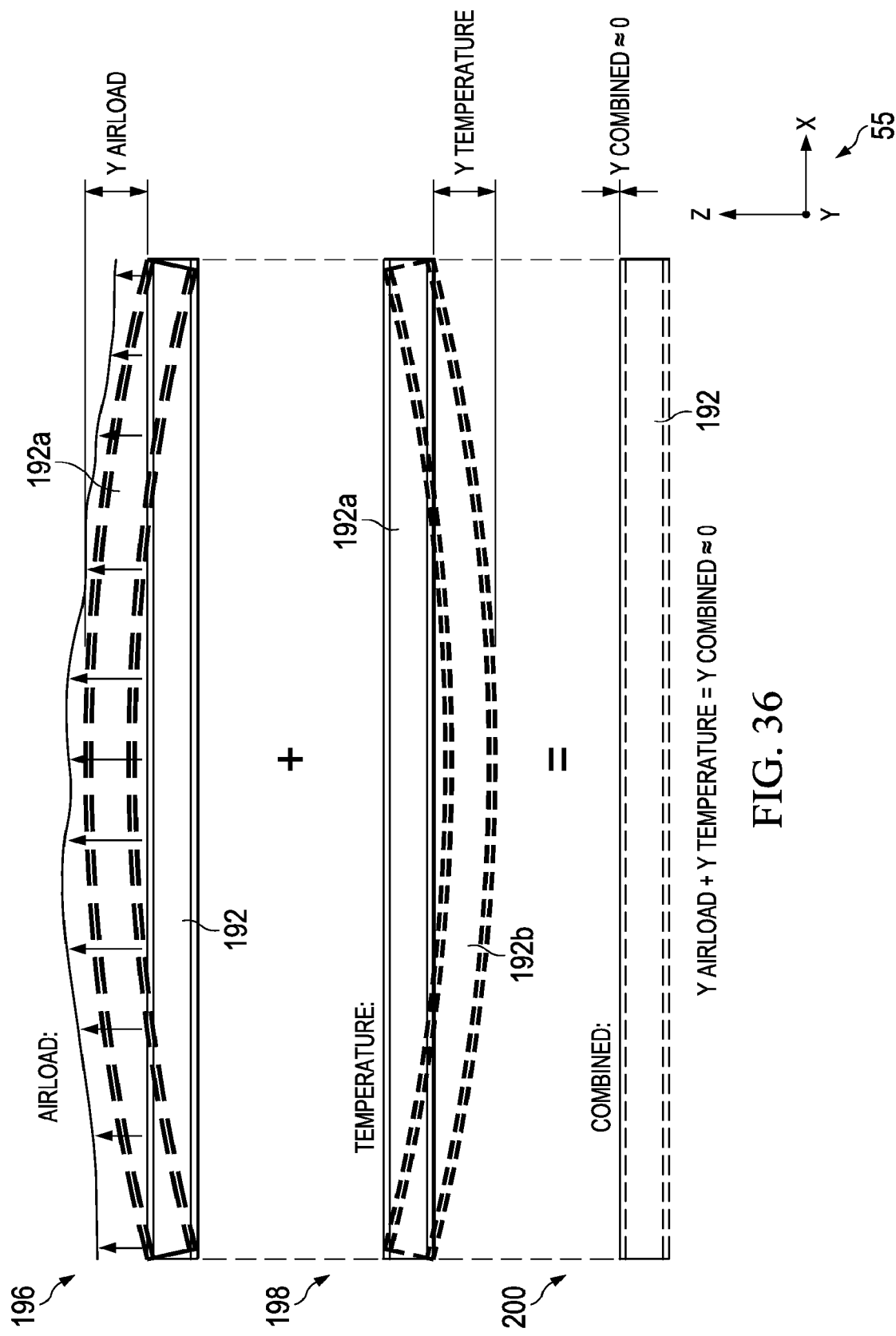
FIG. 36 is an illustration of a cross sectional view of a sandwich construction for a wing segment thermally tuned to counteract deflections resulting from air loads.

Particularly under high altitude cruise flight conditions, where the environmental temperature is consistently cold, it may be desirable to tune the panel sandwich 192 so that the airfoil shape of wing segments 52 has an ideal shape. Referring to FIG. 36, as shown at 196, air loading may cause the panel 192 sandwich to bow 192a upwardly, while at 198, cold temperatures may cause the panel sandwich 192 to bow downwardly 192b. Thus, instead of tuning the panel sandwich 192 to have zero bowing under temperature, the panel sandwich 192 may be tuned so that it will have a slight downward bowing, which may be calculated to equal the anticipated upward deflection of the panel sandwich 192 under air load. As a result, under typical flight conditions, the deflection of the panel sandwich 192 may be nearly zero as shown at 200, which may improve efficiency of the aircraft under cruise conditions.

It may be desirable to tune the panel sandwich layers 178, 189, 188, 190 in the chord-wise direction (Y axis in FIG. 34) in order to compensate for different local air pressures along the wing segment 52. This tuning may be achieved either through choice of materials or by altering the depth, for example, of the blade stringers 74 (FIG. 3) in the chord-wise direction.

Temperature differences between the solar panel and the underlying stiffener layers 188, 190 may result in some degree of bowing of the sandwich panel. To compensate for this temperature differential and reduce bowing, on-board systems (not shown) may be used to cool the solar panels 58 and/or to heat one or more of the stiffener layers 188, 190.

Figure 37:
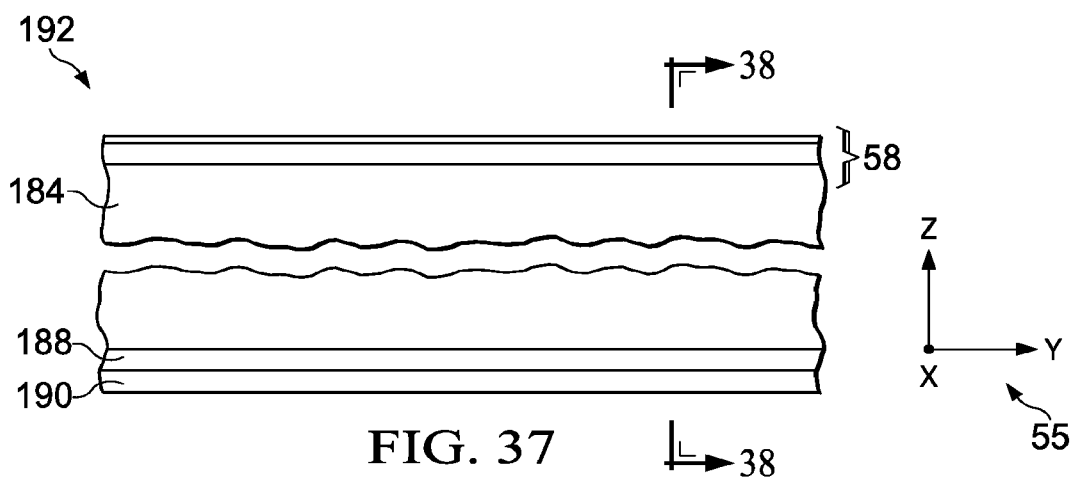
FIG. 37 is an illustration of a cross sectional view of a tuned sandwich panel construction having a discontinuous lower layer.
Figure 38:
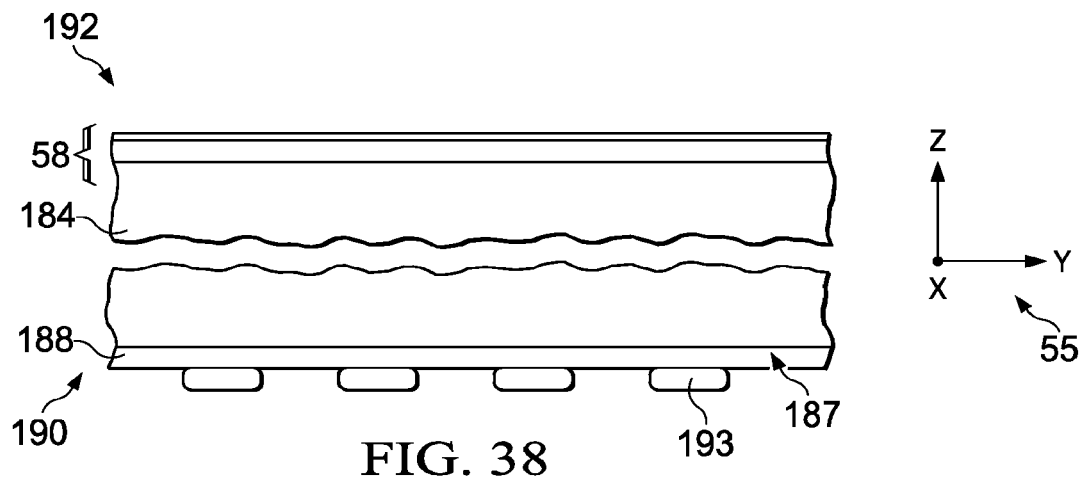
FIG. 38 is an illustration of a sectional view taken along the line 38-38 in FIG. 37.
Figure 39:
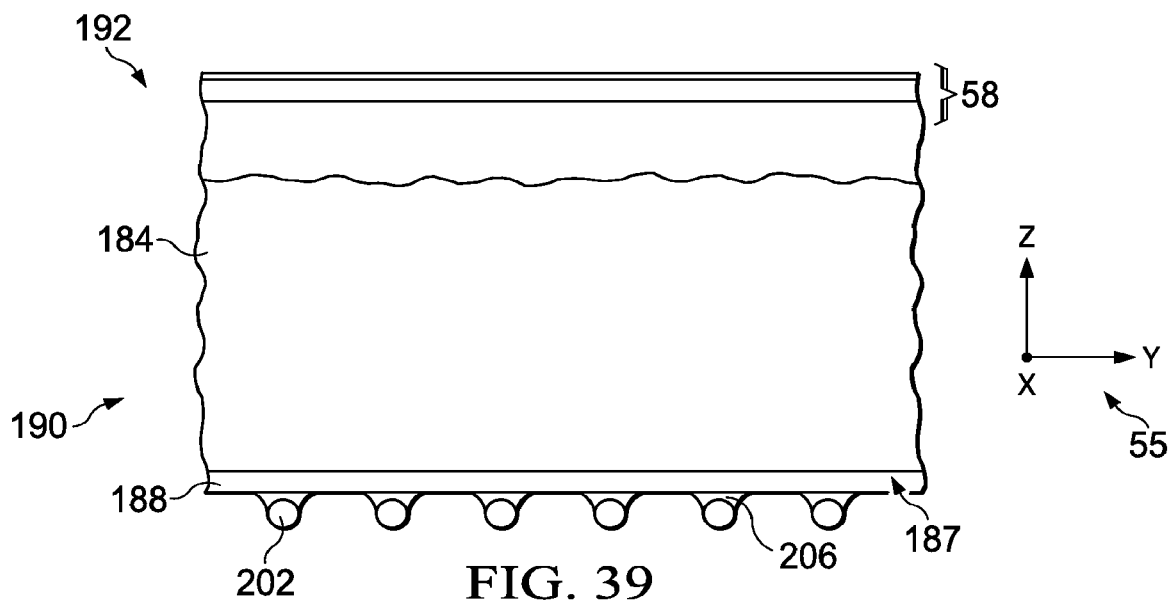
FIG. 39 is an illustration of a cross sectional view of an alternate embodiment of a tuned sandwich panel construction.

The stiffener layers 188, 190 need not be restricted to sheets of material. For example, and without limitation, FIGS. 37 and 38 illustrate a panel sandwich 192 in which the lower stiffener layer 190 is discontinuous in one direction, and comprises of several separate members 193. As shown in FIG. 39, the separate members 193 of stiffener layer 190 shown in FIG. 38 may comprise wires or fibers 202 bonded to the bottom of stiffener layer 188 by a suitable adhesive 206. For example, and without limitation, carbon fibers 202 may be bonded to a stiffener layer 188 of titanium comprising the inner facesheet 187 covering the core 184.

Figure 40:
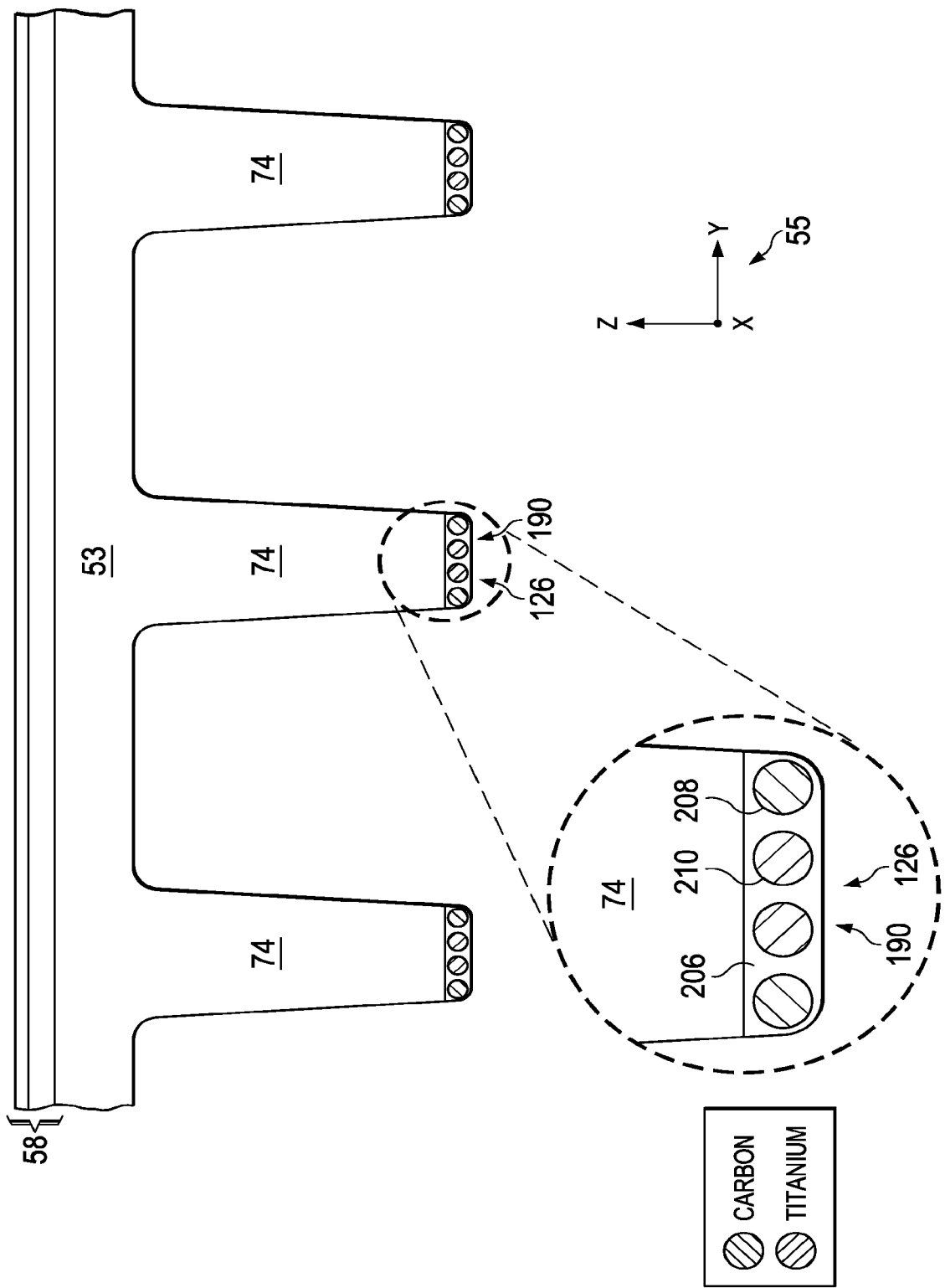
FIGS. 40-43 are illustrations of cross sectional views respectively showing alternate embodiments of tuned wing panel sandwich constructions.
Figure 41:
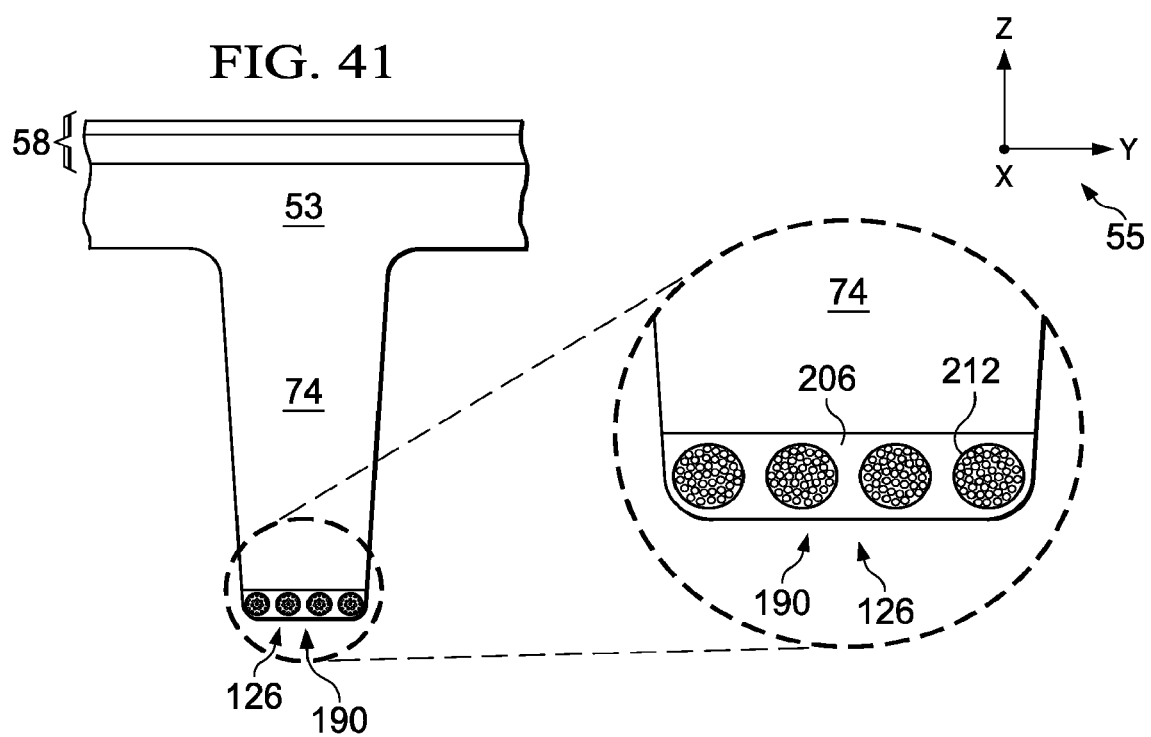
Figure 42:
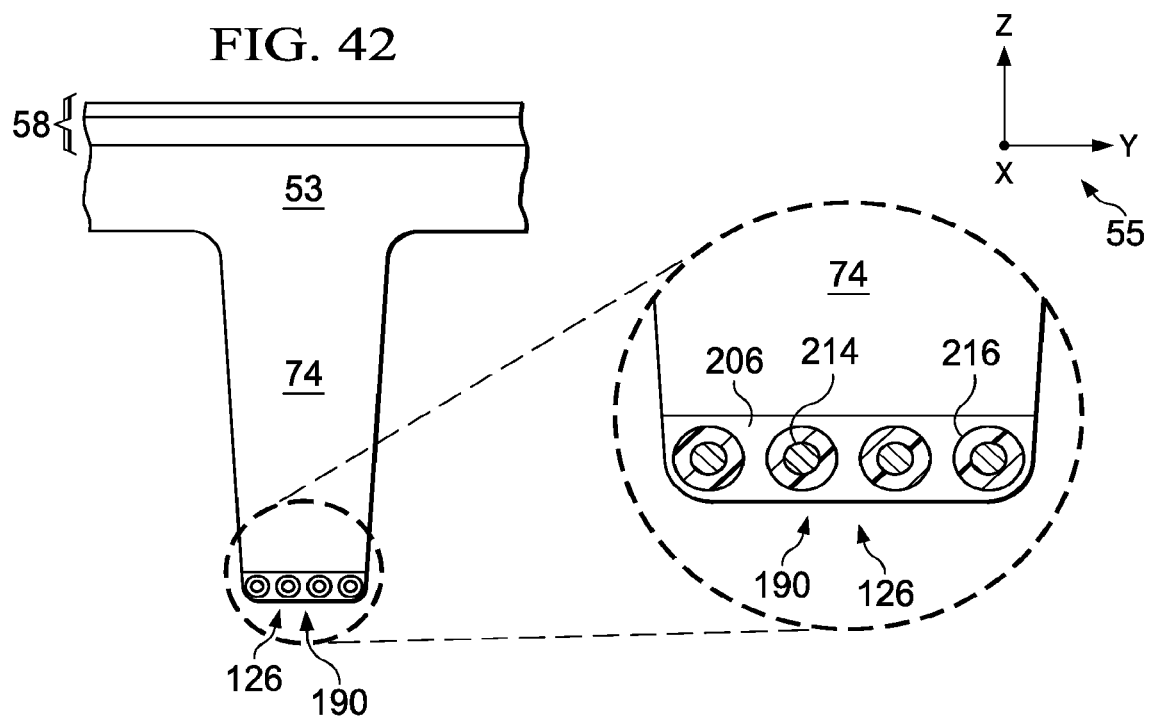
Figure 43:
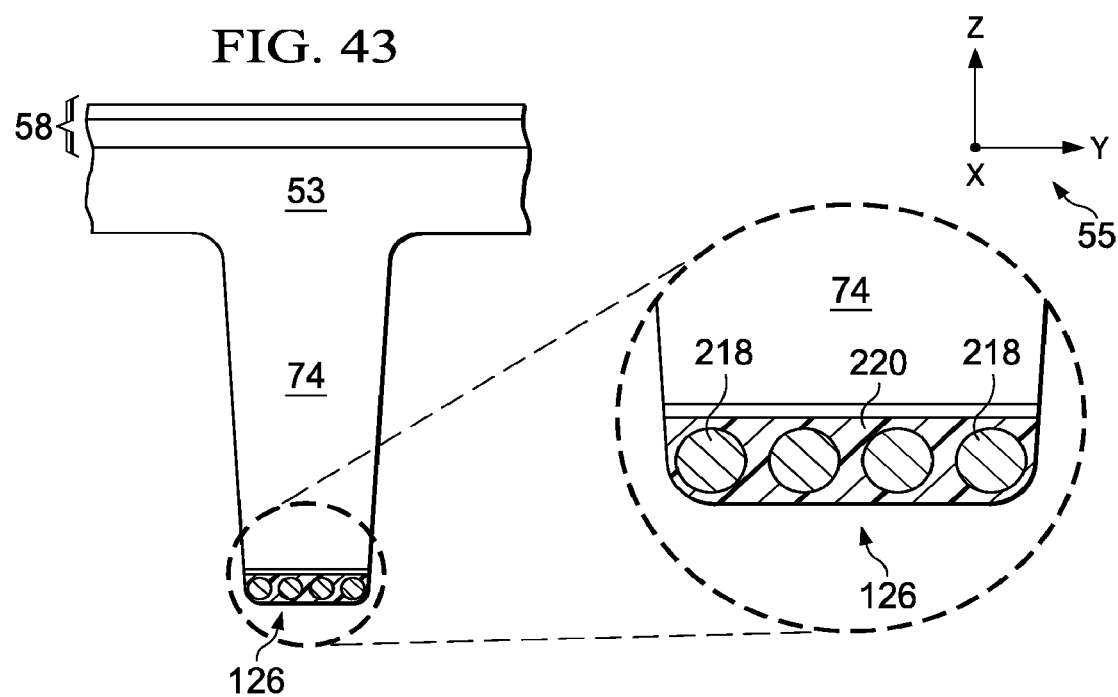

The distribution of the materials forming the layers 178, 180, 188 and 190 may take any of numerous forms. For example, as shown in FIG. 40, the lowest stiffener layer 190 may comprise a plurality of carbon and titanium wires 208, 210 respectively, secured to the lower cap 126 of the stringers 74 by an adhesive 206. In contrast, as shown in FIG. 41, the lower stiffener layer 190 may comprise cables 212 that are not homogeneous materials, but rather each comprise of a mixture of many fibers of the two differing materials, such as, without limitation carbon and titanium. The ratio of areas of the differing fibers forming the cables 212 may be calculated based on the CTE tuning method previously described. Alternatively, as shown in FIG. 42, the two materials of stiffener layer 190 may comprise wires 214 of a first suitable material that are coated with a layer 216 of a second suitable material. Still another embodiment of the lower stiffener layer 190 is shown in FIG. 43, in which wires 218 of a first suitable material are encased in a layer 220 of a second suitable material. The wires 218 in the example shown in FIG. 43 may comprise, without limitation, carbon and the layer 220 of encasing material may be a plastic having a relatively high coefficient of thermal expansion.

Figure 44:
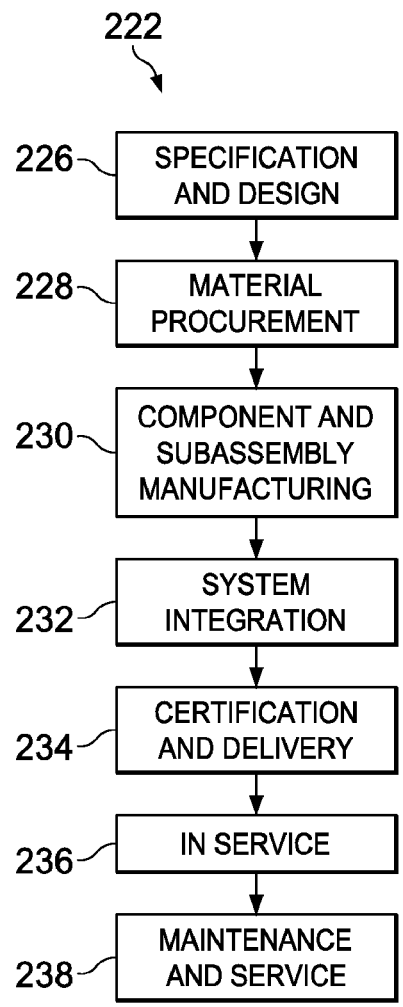
FIG. 44 is an illustration of a flow diagram of aircraft production and service methodology.
Figure 45:
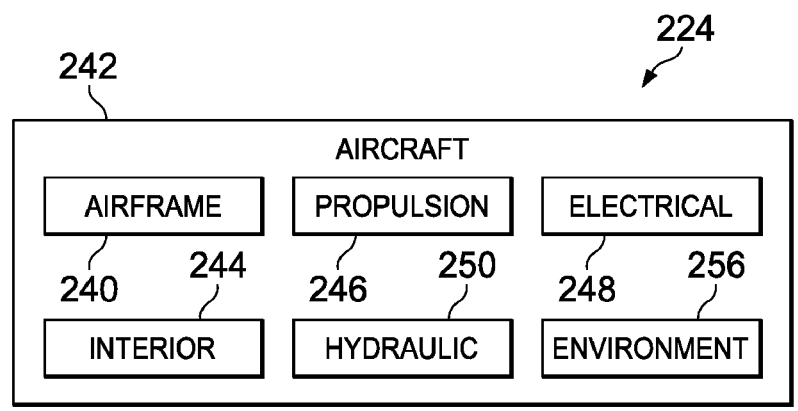
FIG. 45 is an illustration of a block diagram of an aircraft.

Embodiments of the disclosure may find use in a variety of potential applications, particularly in the transportation industry, including for example, aerospace, marine, automotive applications and other application where automated layup equipment may be used. Thus, referring now to FIGS. 44 and 45, embodiments of the disclosure may be used in the context of an aircraft manufacturing and service method 222 as shown in FIG. 44 and an aircraft 224 as shown in FIG. 45. During pre-production, exemplary method 222 may include specification and design 226 of the aircraft 224 and material procurement 228. During production, component and subassembly manufacturing 230 and system integration 232 of the aircraft 224 takes place. Thereafter, the aircraft 224 may go through certification and delivery 234 in order to be placed in service 236. While in service by a customer, the aircraft 224 is scheduled for routine maintenance and service 238, which may also include modification, reconfiguration, refurbishment, and so on.

Each of the processes of method 222 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 45 the aircraft 224 produced by exemplary method 222 may include an airframe 240 with a plurality of systems 242 and an interior 244. Examples of high-level systems 242 include one or more of a propulsion system 246, an electrical system 248, a hydraulic system 250, and an environmental system 256. Any number of other systems may be included. Although an aerospace example is shown, certain of the principles of the disclosure may be applied to other industries, such as the marine and automotive industries.

Systems and methods embodied herein may be employed during any one or more of the stages of the production and service method 222. For example, components or subassemblies corresponding to production process 230 may be fabricated or manufactured in a manner similar to components or subassemblies produced while the aircraft 224 is in service. Also, one or more apparatus embodiments, method embodiments, or a combination thereof may be utilized during the production stages 230 and 232, for example, by substantially expediting assembly of or reducing the cost of an aircraft 222. Similarly, one or more of apparatus embodiments, method embodiments, or a combination thereof may be utilized while the aircraft 224 is in service, for example and without limitation, to maintenance and service 238.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft wing, comprising:
   a wing spar;
   a plurality of wing segments mounted on the spar and having an outer skin;
   a solar collection panel mounted on the skin of a wing segment of the plurality of wing segments for generating electricity using collected solar energy; and
   a plurality of integral stringers for each wing segment of the plurality of wing segments, the integral stringers comprising an electrically conductive, substantially rigid reinforcing rod configured to reinforce the skin, the rigid reinforcing rod electrically coupled with the solar panel and conducting configured to conduct electricity generated by the solar panel.

2. The aircraft wing of claim 1, further comprising:
   the plurality of stringers formed integral with the skin and extending in the span-wise direction of the wing segment, each of the stringers including a blade having opposite ends and caps respectively on the opposite ends; and
   a plurality of the substantially rigid, electrically conductive reinforcing rods respectively located on at least one of the caps and extending in the span-wise direction.

3. The aircraft wing of claim 2, wherein:
   the rods include first and second sets thereof; and
   the first and second sets of rods are respectively located at the caps of the blades.

4. The aircraft wing of claim 3, wherein the rods include one of carbon fiber, glass fiber, aluminum and titanium.

5. The aircraft wing of claim 1, further comprising:
   a pair of spaced apart wing ribs extending in a chord-wise direction of the wing segment for mounting the wing segment on the spar, each of the ribs including an electrically conductive portion configured to electrically couple the reinforcing rod with the solar panel.

6. The aircraft wing of claim 1, further comprising:
   the plurality of wing segments spaced apart to form gaps between the wing segments; and flexible electrical conductors extending across the gaps for coupling the electrically conductive, substantially rigid reinforcing rods of adjacent ones of the wing segments.

7. The aircraft wing of claim 1, further comprising:

the plurality of the wing segments spaced from each other, each of the wing segments including a pair of spaced apart internal ribs having electrically conductive upper caps;

a plurality of the solar collection panels, wherein a solar collection panel of the plurality of solar collection panels is mounted on each wing segment of the plurality of wing segments and respectively electrically coupled with the electrically conductive upper caps of the ribs; and electrical connections coupling the ribs together for manifolding the electricity generated by the plurality of solar collection panels.

8. The aircraft wing of claim 7, wherein the electrical connections for manifolding the electricity include electrical conductors that vary in gauge size along their lengths to carry increasing amounts of electricity along the length of the aircraft wing.

9. The aircraft wing of claim 7, wherein the electrically conductive upper caps of the ribs includes at least two materials having substantially different coefficients of thermal expansion, and in a proportion such that the combined coefficient of thermal expansion of the at least two materials matches that of a coefficient of thermal expansion of the solar collection panel.

10. The aircraft wing of claim 1, wherein the solar collection panel includes a polymer substrate layer covered by a layer of copper.

11. The aircraft wing of claim 1, wherein the electrically conductive, substantially rigid reinforcing rod is includes cables formed of at least two differing materials.

12. The aircraft wing of claim 11, wherein the cables are encased in a third material.

* * * * *